(12) United States Patent
Robinson

(10) Patent No.: US 6,485,230 B2
(45) Date of Patent: Nov. 26, 2002

(54) SUBMERSIBLE MODULAR DIKE AND METHOD FOR SEGREGATING BODY OF WATER

(76) Inventor: Robert A. Robinson, P.O. Box 476, Indio, CA (US) 92202

( * ) Notice: Subject to any disclaimer, the term of this patent is extended or adjusted under 35 U.S.C. 154(b) by 0 days.

(21) Appl. No.: 09/917,125

(22) Filed: Jul. 27, 2001

(65) Prior Publication Data

US 2002/0018696 A1 Feb. 14, 2002

Related U.S. Application Data

(60) Provisional application No. 60/222,234, filed on Aug. 1, 2000.

(51) Int. Cl.[7] ................................................. E02B 7/08
(52) U.S. Cl. .......................... 405/64; 405/107; 405/112; 405/116; 405/205; 114/267
(58) Field of Search ............................. 405/64, 84, 107, 405/110–112, 114, 116, 118–123, 219, 204–206; 114/266, 267, 45; 425/61

(56) References Cited

U.S. PATENT DOCUMENTS

| | | | | |
|---|---|---|---|---|
| 277,732 A | | 5/1883 | Howell | |
| 630,457 A | * | 8/1899 | Hogeland | ..................... 405/84 |
| 690,840 A | | 1/1902 | Daime | |
| 903,598 A | * | 11/1908 | Mehlhorn et al. | ............. 114/45 |
| 1,002,161 A | * | 8/1911 | Lambert | ....................... 405/286 |
| 3,464,212 A | * | 9/1969 | Yamagata et al. | ....... 405/219 X |
| 3,786,773 A | * | 1/1974 | Preus | ........................... 114/45 |
| 3,799,093 A | * | 3/1974 | Thomson | ..................... 114/266 |
| 3,976,022 A | * | 8/1976 | Lapeyre | ........................ 114/45 |
| 4,510,877 A | * | 4/1985 | Bloxham | ...................... 114/45 |
| 4,615,289 A | * | 10/1986 | Bloxham | ...................... 114/45 |
| 4,661,014 A | * | 4/1987 | Aubert | ......................... 405/111 |
| 4,869,620 A | * | 9/1989 | Dow | ........................... 405/206 |
| 4,938,629 A | * | 7/1990 | Boudrias | ..................... 405/205 |
| 5,013,184 A | * | 5/1991 | Omachi | ..................... 405/84 X |
| 5,118,222 A | * | 6/1992 | Dow | ........................... 405/262 |
| 5,215,027 A | * | 6/1993 | Baxter | ......................... 114/266 |
| 5,913,278 A | * | 6/1999 | Mitchell | ........................ 114/45 |
| 6,012,872 A | | 1/2000 | Perry et al. | |

FOREIGN PATENT DOCUMENTS

| | | |
|---|---|---|
| DE | 952787 | 11/1956 |
| JP | 0123510 | 7/1985 |
| JP | 11315528 | * 11/1999 |

OTHER PUBLICATIONS

Columbia University Press Article entitled "Cofferdams" by Lazarus White and Edmund Astley Prentis, New York, 1950.

* cited by examiner

Primary Examiner—Heather Shackelford
Assistant Examiner—Jong-Suk Lee
(74) Attorney, Agent, or Firm—Sheldon & Mak; Denton L. Anderson

(57) ABSTRACT

A modular dike is used to divide a body of water into two distinct parts. The modular dike uses a plurality of floatable modules. Each module is floated into the body of water and sunk at predetermined locations in the body of water. The modules are aligned in a row within the body of water so that the row of modules forms a dike which effectively segregates the body of water into two distinct parts.

22 Claims, 15 Drawing Sheets

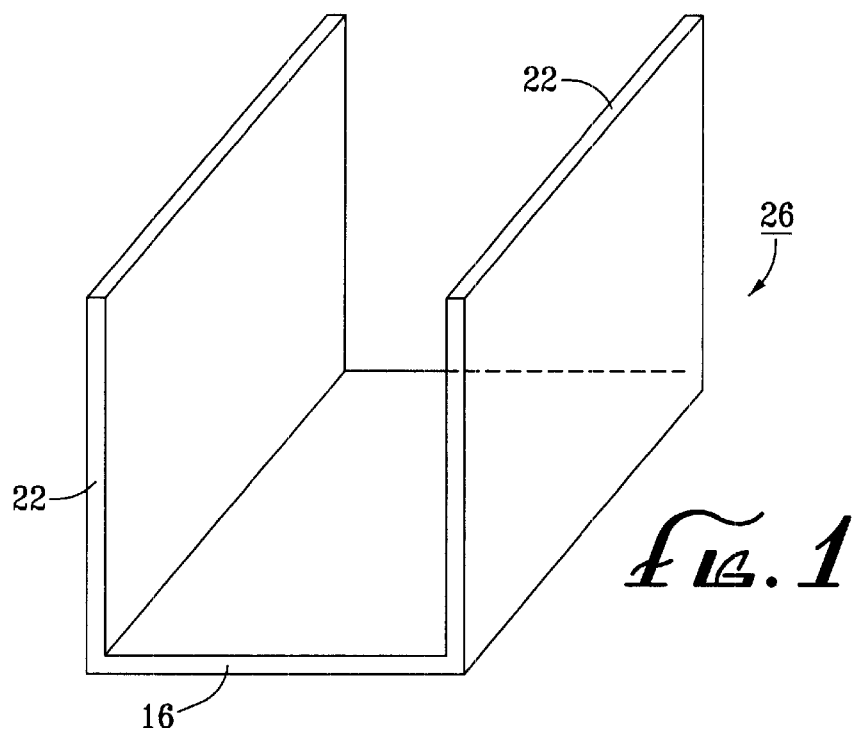
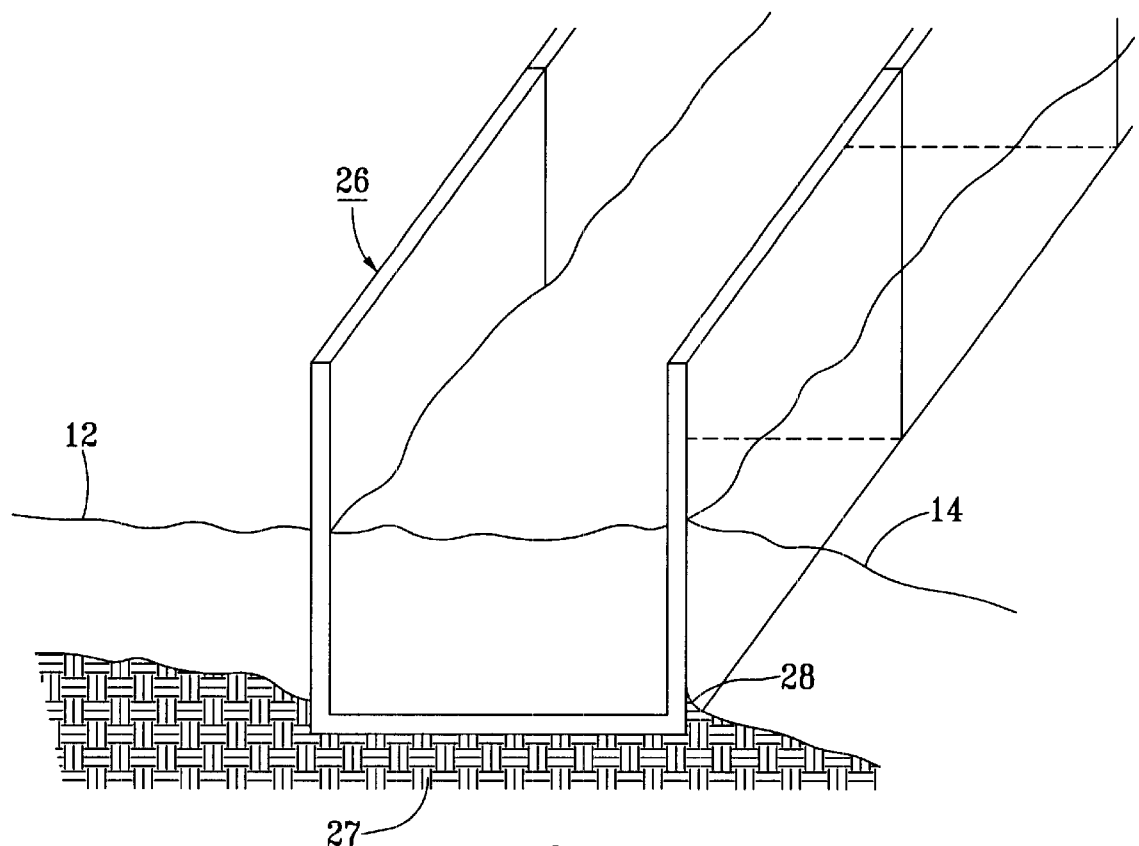

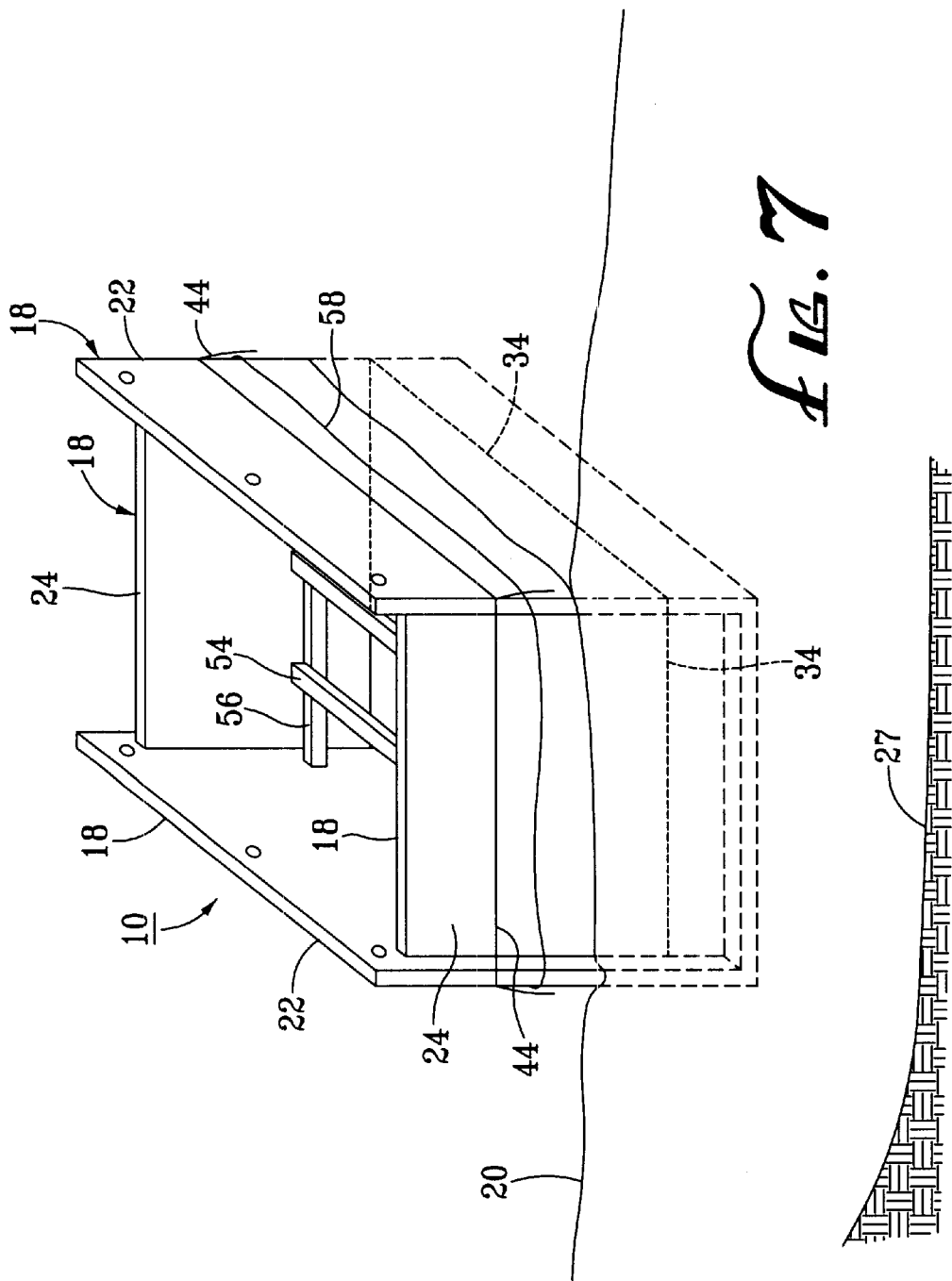

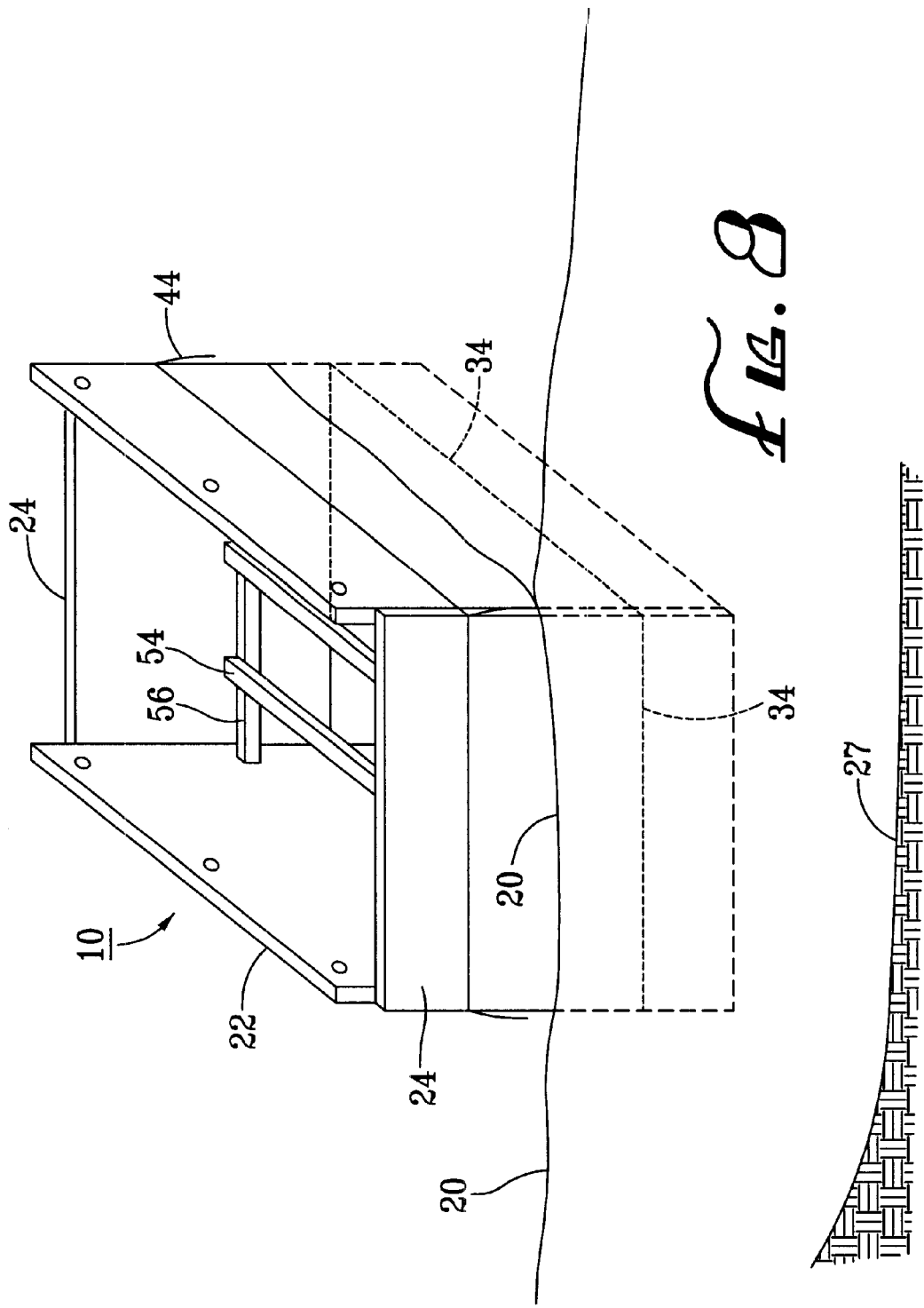

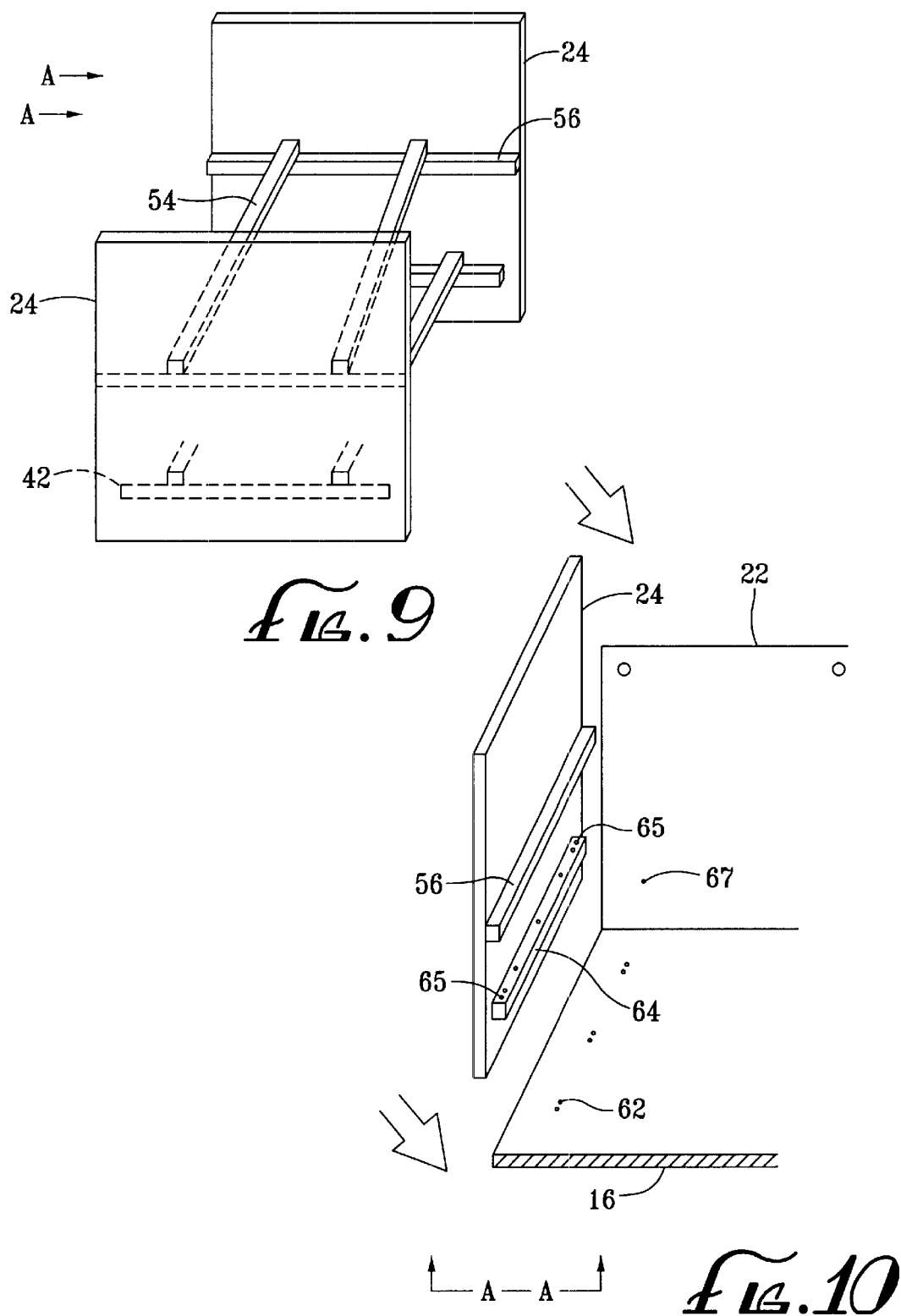

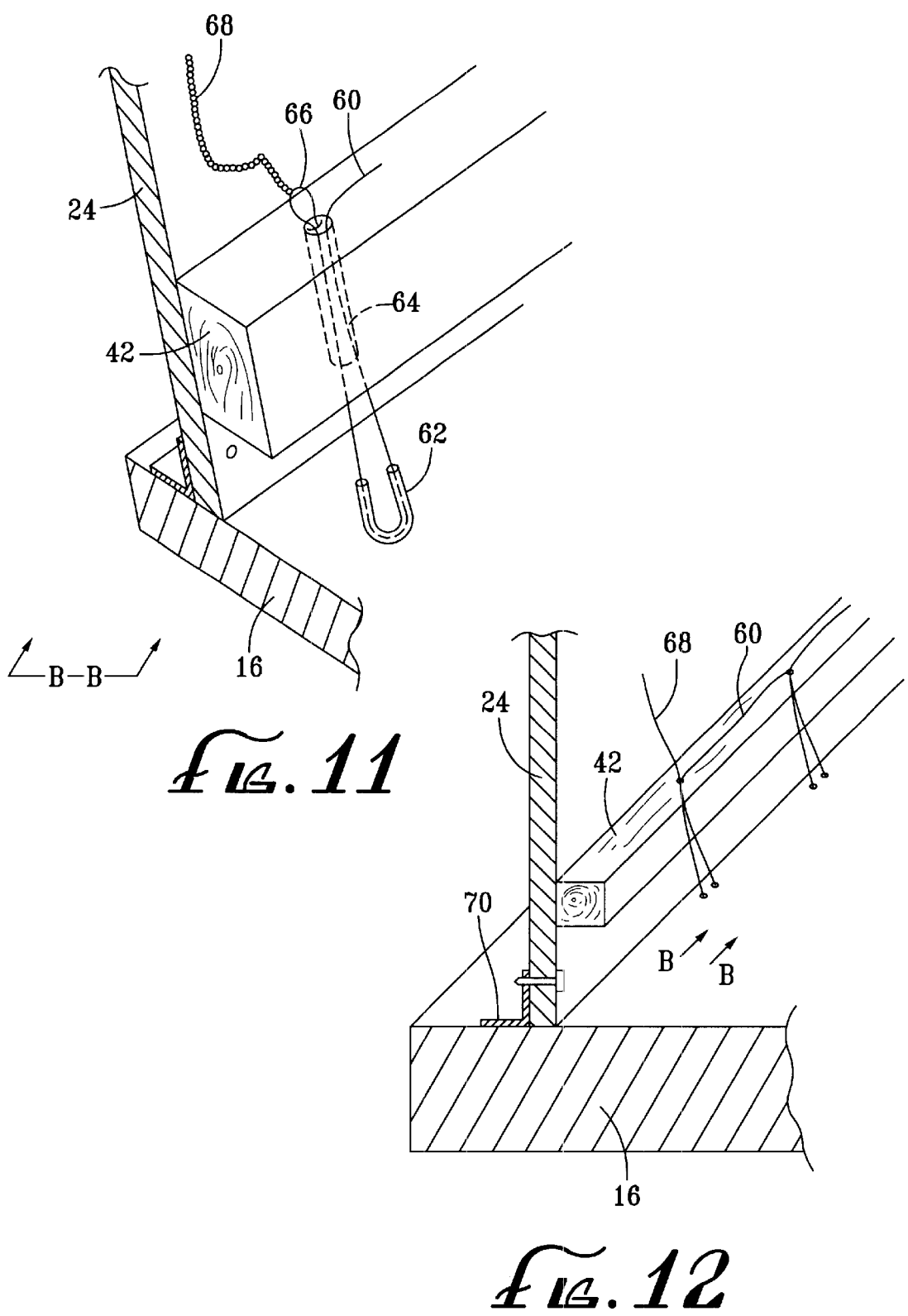

SUBMERSIBLE MODULAR DIKE AND METHOD FOR SEGREGATING BODY OF WATER

This application claims the benefit of U.S. Provisional Application Ser. No. 60/222,234 filed Aug. 1, 2000.

FIELD OF THE INVENTION

This invention relates generally to water barriers and, more specifically, to barriers which divide water bodies into separate sections, each with a different water quality or elevation.

BACKGROUND OF THE INVENTION

Numerous hypersaline lakes exist in a dynamic balance between water inflow and evaporation throughout the arid regions in southwestern United States. When activities by man, or nature, change the rate of water inflow from the surrounding watershed, the dynamic balance in the hypersaline water body shifts. Decreases in water inflow produce lower lake water levels and smaller lake volume. If the lake is closed with no outlet, all the dissolved salt contained in the lake must reside in a smaller water volume. A smaller volume with the same total salt produces a higher salinity. In closed water bodies, a lower or higher water elevation represents a significant change in lake volume, thereby inducing significant changes in salinity levels which can cause considerable environmental nuisance or harm to resident fish, wildlife, and vegetation.

A number of approaches have been used for controlling the water quality and elevation of hypersaline lakes in arid regions. One approach is to control only to elevation. In this approach, large pumps are employed to pump excess water to a different area. This approach was recently effective near the Great Salt Lake in Utah. The Great Salt Lake had risen, due to increased in flow, and threatened to inundate a highway. Installation of large internal combustion engine driven pumps and the construction of a lengthy earthen dike allowed excess water to be pumped to another area, thereby lowering the Great Salt Lake. However, the use of large pumps typically entails prohibitively high capital costs and maintenance expenses.

Another approach is to control both elevation and water quality. In this approach, the hypersaline water body is physically divided into separate sections. One section is dedicated to serving as a salt repository while the other section is stabilized at the desired salinity. Typically the salt repository is located so that water from the surrounding watershed does not enter, or is redirected around, the salt repository. If inflow from the watershed decreases, the salt repository can also stabilize the elevation in the stabilized section by varying the water levels within the salt repository. Traditionally, this approach is accomplished by constructing one of a variety of large earthen dikes. The materials used to build such dikes range from hydraulic fill pumped by floating dredges, to sanitary landfill materials, to carefully graded and compacted soils. However, large earthen dikes have significant disadvantages. Being made of earth, dikes are readily susceptible to wave erosion. To minimize damage from wave erosion, large rocks or other "armoring" must be placed on the side of the dike. Also, large earthen dikes require relatively flat side slopes in order to maintain slope stability under water. Most notably, the volume of earth required to make a dike increases geometrically as water depths increase. Generally when water depths exceed 25 feet, the large volume of earth required to construct a stable dike makes the dike prohibitively expensive.

An alternative method of dividing water bodies comprises the use of sheet piling such as narrow interlocking strips of steel plate which extend down into the bottom of the water body. However, steel piling is inappropriate in hypersaline lakes because of excessive corrosion rates. Use of alternative materials such as plastics, does not provide the necessary strength in depths greater than 25 feet. Stainless steel or specially coated steel sheet piles are prohibitively expensive. Finally, the sheet pile, once driven into the lake bottom, is difficult if not impossible to remove and relocate.

Another alternative method is the use of inflatable materials such as those used to create inflatable rubber dams. However, inflatable dams require an expensive permanent fixed foundation. If not provided with a permanent fixed foundation, the inflatable dam undergoes large lateral displacements which frequently rupture the connection between the rubber dams and their associated inflation blowers.

Other alternative methods of dividing water bodies have been proposed. In a September, 1997 report by the United States Department of the Interior, Bureau of Reclamation, entitled "Salton Sea Barrier Curtain Project" by Gerald Martin, for example, there is proposed use of a high density polyethylene dam or curtain. The report suggests that the body of water be separated into an evaporative section and a fresher water section. The report recognizes that minor lateral movement is inconsequential so long as it does not damage the barrier nor allow intermixing. The report also recognizes that an absolutely water tight seal is not necessary. This proposed use of a polyethylene curtain has certain advantages compared to the earthen dike and sheet piling concepts because the floating curtain avoids the expense and effort in maintaining an unnecessarily water tight seal along the entire length of the barrier. However, the disadvantages to the use of a polyethylene curtain are significant. The curtain will not resist even minor wind induced currents within the water body and will move large distances if unrestricted. If weighted sufficiently so that lateral movement is impossible, minor currents will push the curtain down, submerging the suspending floats and allowing water to pass from one section to another. Stronger currents will move the curtain laterally to where surface irregularities will snag or tear the curtain again allowing water to intermix.

Yet another alternative method of dividing water bodies makes use of floating concrete structures. Use of floating concrete structures is well known, and various types of floating docks and breakwaters are presently available and in use. However, the prior art types of floating docks and breakwaters have several inherent problems. For one thing, the materials used in such prior art devices to provide buoyancy in both salt and fresh water have consistently been found wanting because of the harsh marine environment. High salinity causes the relentless deterioration of the exposed components and materials thereof. Examples include: woods of various types, hollow fiberglass structures having a variety of shapes and concrete pontoons filled with foams of various types.

U.S. Pat. No. 3,799,093 to Thompson (1974) discloses a floating prestressed concrete wharf which extends the length of previously built concrete wharfs through the use of steel cables. The concrete wharf is encased in a wire reinforcing mesh which acts as temperature and shrinkage reinforcement. However, over time the thinness of the concrete combined with the permeability of concrete will allow highly saline water to enter and corrode the reinforcing steel leading to failure of the wharf. Moreover, the floating nature of the wharf prevents it from submerging, preventing the device from serving as a barrier to divide a water body into separate sections.

U.S. Pat. No. 5,215,027 to Baxter (1993) discloses a concrete floatation module for use as a floating dock or breakwater. The device recognizes the permeability of concrete and suggests the use of polyolefin fibers. The fibers are impervious to corrosion unlike common metal reinforcing materials. While the improvement suggested by Mr. Baxter greatly enhances longevity, the same floating nature of the module prevents it from dividing a water body.

A submergible breakwater disclosed in U.S. Pat. No. 4,938,629 to Boudrias describes a wharf made of hollow shells in which water can be introduced or withdrawn by an air blower. The units are strung together with a cable system and can be submerged or floated as required. The device uses plastic to ensure air tight chambers in concrete. Under submerged hypersaline conditions, however, the plastic is subject to deterioration and attack from a variety of insects and barnacles. Because the depth of the wharf does not extend down to the bottom of the water body, the device is useless to serve as a barrier to divide a water body into separate sections. Moreover, steel reinforcing within the shells corrodes over time expanding as it oxidizes causing more cracks eventually preventing the breakwater from functioning as described.

Accordingly, there is a need for a method of dividing a body of water into two separate parts which avoids the aforementioned problems in the prior art.

SUMMARY

The invention satisfies this need. The invention is a method for segregating a body of water into two distinct parts. The method comprises the steps of: (a) forming a plurality of floatable modules; (b) floating each of the plurality of modules into the body of water; and (c) sinking each of the plurality of modules at individual predetermined locations in the body of water.

The floatable modules are each created by (i) forming a generally horizontal base wall and one or more generally vertical walls and (ii) assembling the generally vertical walls to the base wall in such a manner so as to form a floatable module.

The generally vertical walls of each module are chosen so as to have sufficient height to protrude above the water level of the body of water after the module is sunk at its predetermined location. Each of the plurality of modules is sunk within the body of water such that each module is in close proximation to at least one adjoining module and such that the plurality of modules are aligned in a row that bifurcates a body of water into a first portion and a second portion.

Before or after the modules are sunk at their predetermined locations, each module is sealed to an adjoining module such that the plurality of modules effectively segregates the first portion of the body of water from the second portion.

In a typical embodiment, the floatable modules are largely made from concrete, some or all of the walls of the module being poured and assembled to one another at the shore of the body of water where they can easily be into position at their individual predetermined locations.

BRIEF DESCRIPTION OF THE DRAWINGS

These features, aspects and advantages of the present invention will become better understood with respect to the following description, appended claims and accompanying figures where:

FIG. 1 is a perspective diagrammatic view of a portion of a first floatable module having features of the invention;

FIG. 2 is a perspective diagrammatic view of the floatable module illustrated in FIG. 1 shown disposed within a body of water;

FIG. 7 is a perspective diagrammatic view of the floatable module illustrated in FIG. 6 shown with both end walls attached;

FIG. 8 is a perspective diagrammatic view of a fourth floatable module having features of the invention;

FIG. 9 is a perspective diagrammatic detail view of end walls and end wall supports useable in a floatable module having features of the invention;

FIG. 10 is an exploded detail view of the end wall portion of a floatable module having features of the invention;

FIG. 11 is a diagrammatic perspective detail view of the attachment of the side walls in floatable modules having features of the invention;

FIG. 12 is a second diagrammatic perspective view of the attachment of side walls in a floatable module having features of the invention;

DETAILED DESCRIPTION

Figure 3:
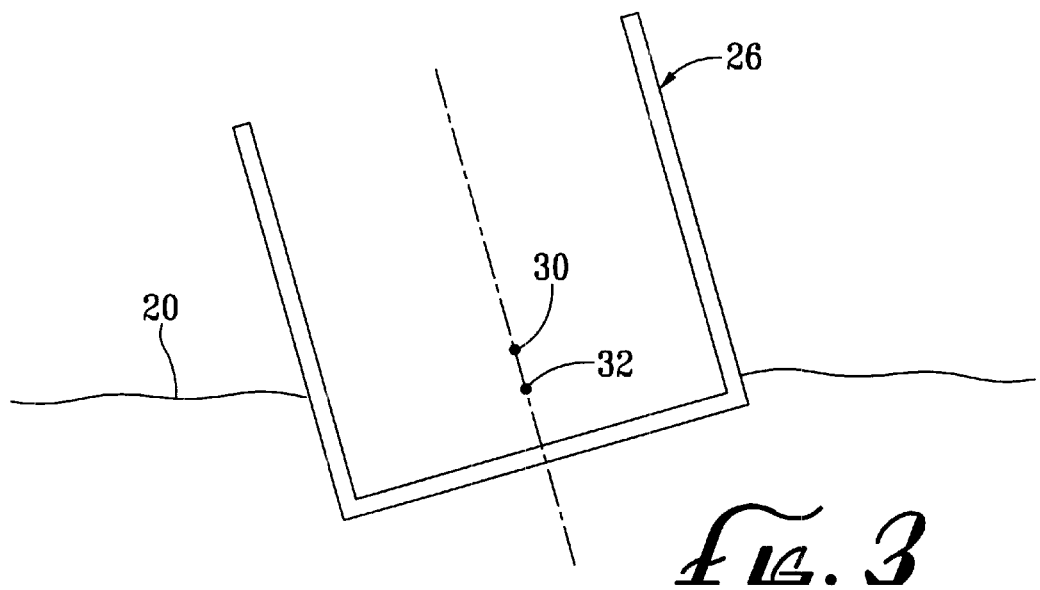
FIG. 3 is an end view of the floatable module illustrated in FIG. 1 shown afloat on a body of water.

The following discussion describes in detail one embodiment of the invention and several variations of that embodiment. This discussion should not be construed, however, as limiting the invention to those particular embodiments. Practitioners skilled in the art will recognize numerous other embodiments as well.

The invention is a method for segregating a body of water 8 into two distinct parts. The method comprises the step of (a) forming a plurality of floatable modules 10, (b) floating each of the plurality of modules 10 onto the body of water 8 and (c) sinking each of the plurality of modules 10 in close proximity to one another at individual predetermined locations in the body of water 8 so that the modules 10 are aligned in a row and the body of water 8 is segregated into a first portion 12 and a second portion 14.

In the method, the plurality of floatable modules 10 are created by (i) forming a greater horizontal base wall 16 and one or more generally vertical walls 18 and (ii) assembling the generally vertical walls 18 to the base wall 16 in such a manner as to form a floatable module 10. The generally vertical walls 18 of each module 10 are chosen so as to have a sufficient height to protrude above the water level 20 of the body of water 8 after the module 10 is sunk at its predetermined location. In the discussion which follows, each of the floatable modules 10 is described as having four generally vertical walls 18, but this is not necessary. Floatable modules 10 having other numbers of generally vertical walls 18 are also possible.

With respect to the modules illustrated in the drawings, the four generally vertical walls 18 comprise a pair of opposed side walls 22 and a pair of opposed end walls. The end walls are referred to herein as bulkheads 24.

The side walls 22 can be assembled to the base wall 16 in a separate step or can be integrally formed with the base wall 16 to yield a single monolithic mass.

A U-shaped combination 26 of a base wall 16 and a pair of opposed, generally vertical side walls 22 is shown in FIG. 1. In this U-shaped combination 26, rectangular side walls 22 and a rectangular base wall 16 are assembled to form a U-shaped trough. The side walls 22 need not be perpendicular to the base wall 16 to function properly. The side walls 22 and the base wall 16 need not be flat. The U-shaped combination 26 can be poured in a concrete form as a single monolithic mass or can be built up in separate sections, such as being poured as concrete slabs and later tilted up.

In the U-shaped combination 26 illustrated in FIG. 1, the side walls 22 are disposed perpendicular to the base wall 16. The base wall 16 is flat as are the side walls 22. In one preferred embodiment, the material used to form the U-shaped combination 26 is concrete without steel reinforcing. However, the U-shaped combination 26 can be comprised of other suitable materials, including reinforced concrete, having sufficient mass and strength to extend to a typical length of about 40 feet (both in height and width) while having a typical thickness of about 1 foot. Typically the side walls 22 and the base wall 16 have the same thickness. Also it is typical that the length of the base wall 16 equals the length of the side wall 22. Still further, it is typical for the height of the side walls 22 to equal the width of the base wall 16.

FIG. 2 illustrates the basic installation of the U-shaped combination 26 illustrated in FIG. 1. After being towed to a predetermined specific location on the body of water 8, the U-shaped combination 26 is filled with water and thus is caused to settle to the bottom 27 of the body of water 8. In this operation, soil fillets 28 develop from displacement of the bottom sediments or fillets 28 are manually placed to ensure a good seal between the module 10 and the body of water 8. The array of modules 10, when placed end to end across a body of water 8, divides the body of water 8 into two separate portions. Typically a first portion 12 is isolated from a larger, second portion 14.

Figure 4:
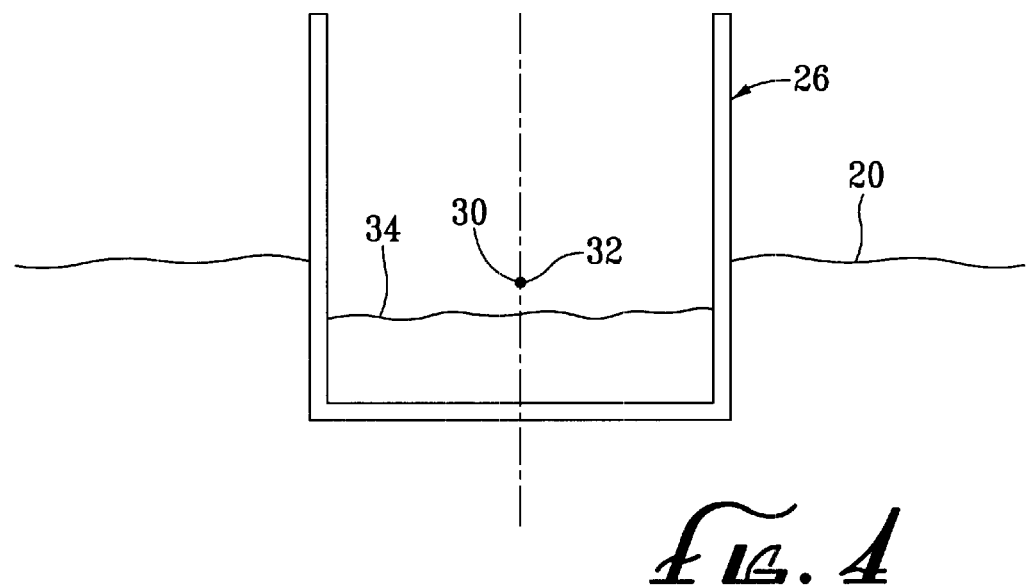
FIG. 4 is an end view of the floatable module illustrated in FIG. 3 shown with ballast disposed therein.

FIGS. 3 and 4 show a module 10 being floated in transport to its individual predetermined location. The module 10 comprises a U-shaped combination 26 which has been enclosed by a pair of opposed bulkheads 24. For clarity, the forward bulkhead 24 is not shown, so that the U-shaped combination 26 is easily illustrated. Also, the module 10 is generally symmetrical along a plane in parallel with the axis of the U-shaped combination 26. The forward bulkhead 24 is identical to the aft bulkhead 24. The left side wall 22 is a mirror image of the right side wall 22. In the invention, the bulkheads 24 are typically removed from the U-shaped combinations 26 after each module 10 is sunk in place, and reused to assemble new modules 10. Such a procedure minimizes costs. Alternatively, the bulkheads 24 can be left in place within each module 10.

FIG. 3 shows the center of gravity 30 of a typical floating module 10 having no ballast. The module 10 has a typical wall thickness of about 1 foot and a height, width and length of about 40 feet. The center of gravity 30 is above the buoyancy metacenter 32 which means that the module 10 tends to list to one side or the other unless ballast 34 is introduced. Because ballast 34 increases the depth of water necessary to float the module 10, ballast 34 generally has to be added after the module 10 is transported out of the assembly area.

The ballast 34 can be water. In such designs, water is added to raise the metacenter 32 as shown in FIG. 4 until it is coincident with the center of gravity 30. Additional water will raise the metacenter 32, requiring additional force to be used to tow the module 10 to its required position in the body of water 8.

Figure 5:
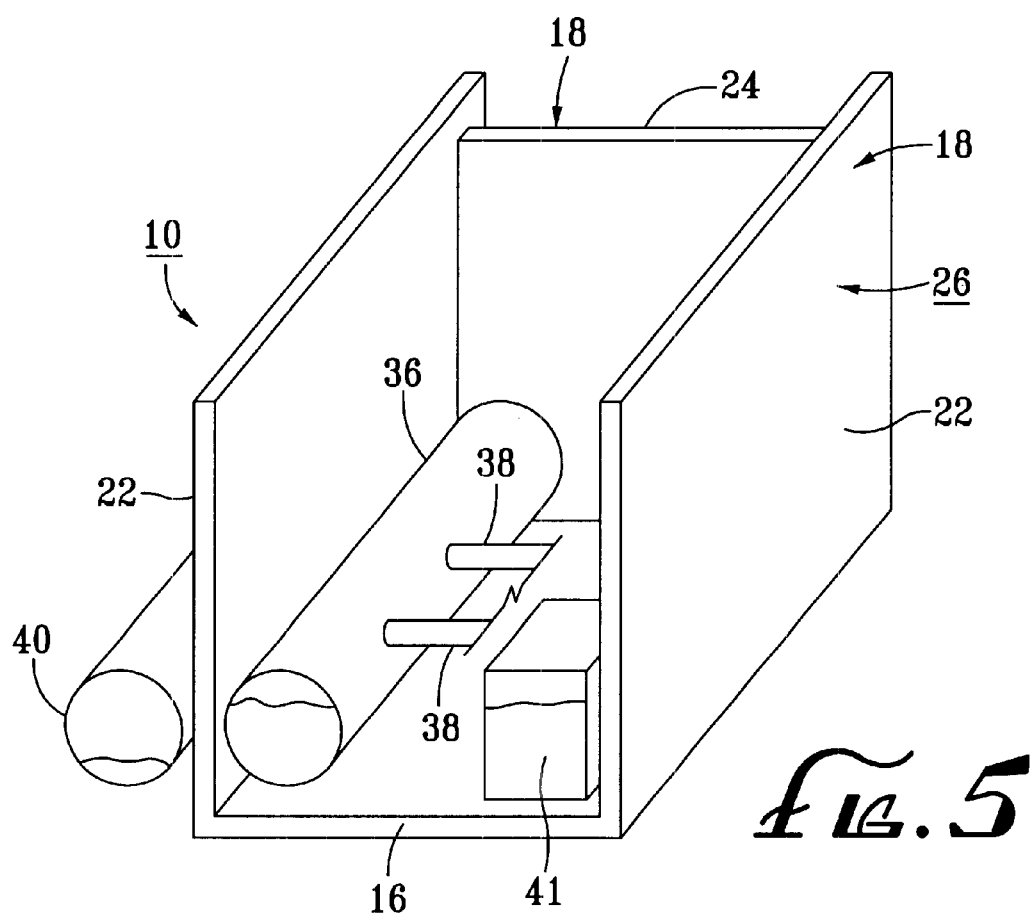
FIG. 5 is a perspective diagrammatic view of a second floatable module having features of the invention.

FIG. 5 shows other typical approaches to raising the metacenter 32 and lowering the center of gravity 30. One approach uses a cylindrical tank 36 having connecting tubes 38 to its mirror opposite (not shown) which lowers the center of gravity 30 and provides additional stability than is provided simply by introducing water into the module 10 without containment. Alternatively, a cylindrical float 40 attached with flexible cables can be used to raise the metacenter 32, thereby reducing the depth of water necessary to float the module 10 and improve vertical stability. Additional alternatives include use of a removable tank 41 located at each corner of the base walls 16.

Figure 6:
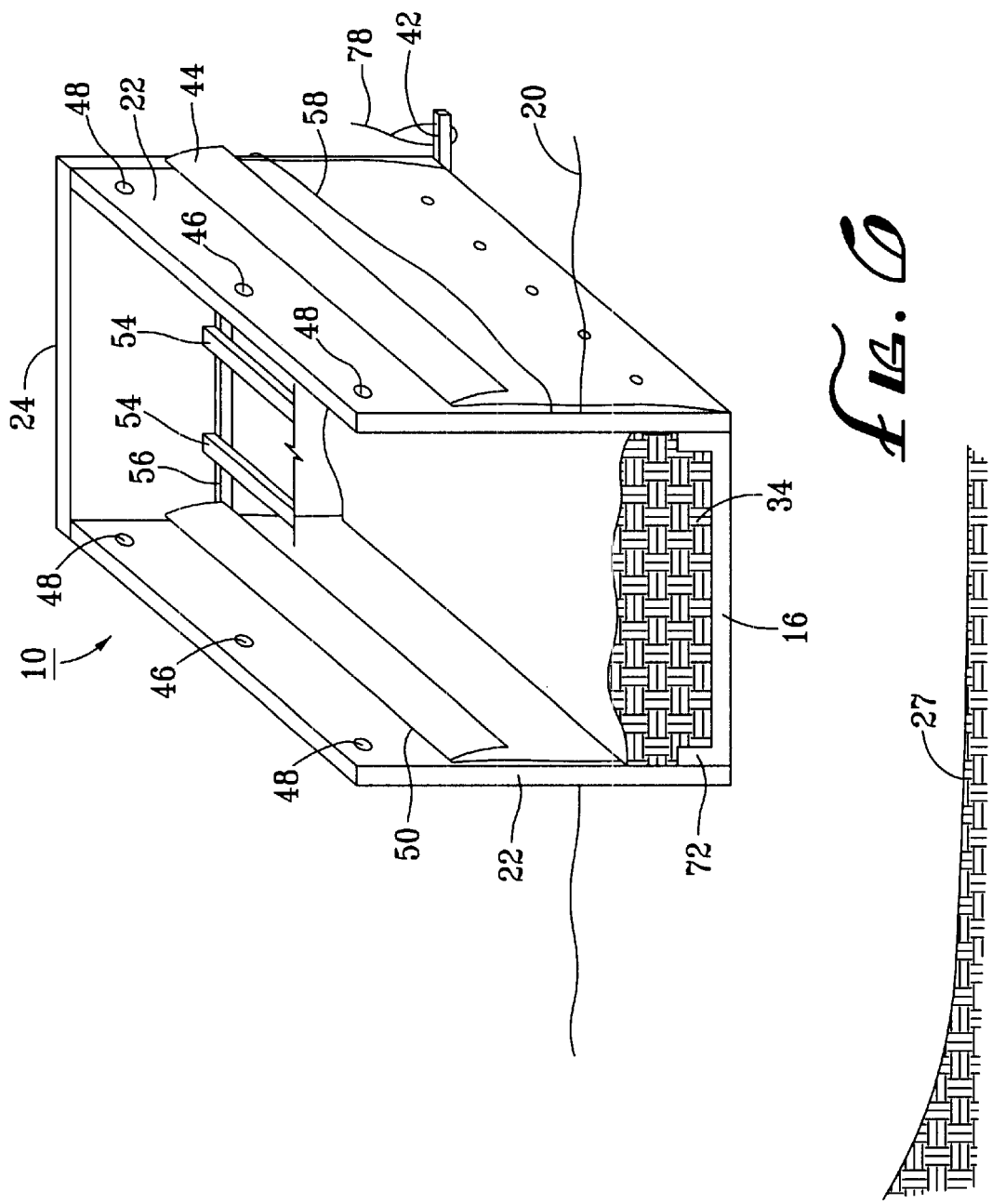
FIG. 6 is a perspective diagrammatic view of a third floatable module having features of the invention.
Figure 13:
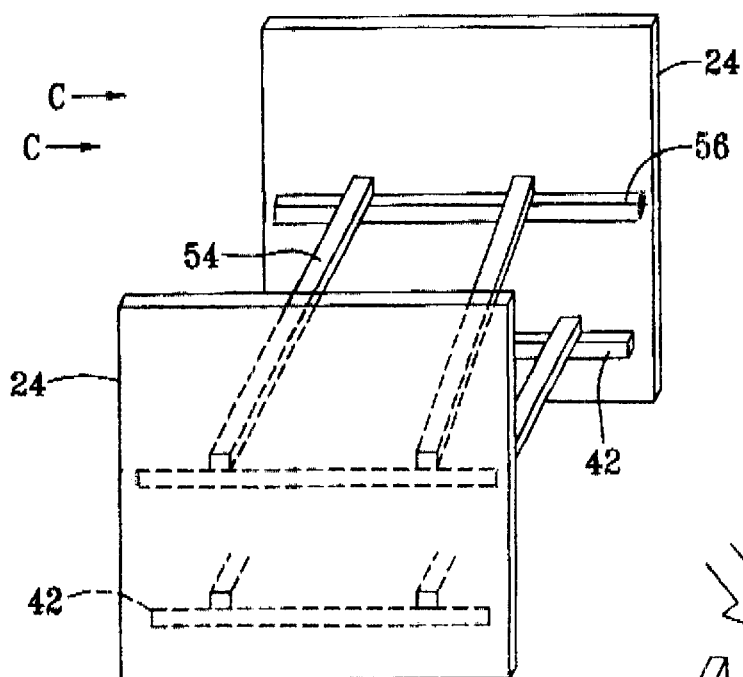
FIG. 13 is a second perspective diagrammatic detail view of end walls and end wall supports useable in floatable modules having features of the invention.

FIG. 6 further illustrates the construction of a typical module 10. A lower bulkhead stiffener 42 is used to provide auxiliary support to the side walls 22. The lower bulkhead stiffener 42 also supports and forms a rough mechanical seal with the base wall 16. To ensure a water tight seal, the module 10 can be wrapped with a first plastic sheet 44, typically polyethelyne. The entire module 10 can be entirely plastic wrapped. Only the seams where the bulkheads 24 join the side walls 22 and base wall 16 need to be wrapped. If, however, the side walls 22 and the base wall 16 are sufficiently straight and true, the first plastic sheet 44 may not be required. All that may be required is a pump of sufficient size to pump out water leakage from around the bulkheads 24.

In the embodiment illustrated in FIG. 6, access holes 46 for a safety cable used to prevent lateral side wall movement and access holes 48 for cable ties to adjacent floating modules 10 are also provided.

In a typical embodiment, a second plastic sheet 50, typically polyethylene, is hung prior to the introduction of soil ballast 34.

Upon arrival after transport, the module 10 is lowered in position by introducing water into the module 10. A gap between individual modules is maintained in order to move the bottom of the aft bulkhead 24 outward sufficiently so that the lower bulkhead stiffener 42 will clear the base wall 16 and side walls 22. The gap provides room to place spacer blocks 52 as detailed in FIG. 21. Two braces 54 on each lower bulkhead stiffener 42 transmit the inward force between forward and aft bulkheads 24. An upper bulkhead stiffener 56 serves as the connection between each brace 54 and a bulkhead 24. In a preferred embodiment, brace 54, bulkhead 24, and lower bulkhead stiffener 42 are made of wood. However, other materials having sufficient mass and strength, such as unreinforced concrete, reinforced concrete, or steel, can be used.

A hoop cable 58 is employed for attaching a tow line to the module 10 during transport.

FIG. 7 illustrates the use of an internal-type bulkhead 24. The bulkhead 24 is slightly smaller in width than the distance between the two side walls 22 in order to fit into the space afforded by the side walls 22. An upper bulkhead stiffener 56 is shown providing the connection with an internal bulkhead brace 54. If the U-shaped combination 26 is not monolithic, but built up from independent parts such as separate slabs for the side walls 22 and the base wall 16, the bulkheads 24 and stiffeners 56 will provide lateral support against water pressure seeking to push the side walls 22 inward. The U-shaped combination 26 is wrapped in the first plastic sheet 44 to provide for a water tight seal. The embodiment illustrated in FIG. 7 uses water as ballast 34, but other methods of providing ballast 34 can be used, as previously described.

FIG. 8 illustrates an alternative bulkhead 24 attached externally to a monolithic U-shaped combination 26. The bulkhead 24 is slightly larger in width than the distance between the two side walls 22 in order to span the gap between side walls 22. An upper bulkhead stiffener 56 is provided to connect the internal bulkhead braces 54. Each bulkhead brace 54 is slightly longer than the distance between the two side walls 22. If the U-shaped combination 26 is built up from independent parts, such as from concrete slabs for the side walls 22 and the base wall 16, the upper bulkhead stiffener 56 takes on additional importance because it provides the principal lateral support against water pressure seeking to push in the side walls 22. The U-shaped combination 26 is wrapped in the first plastic sheet 44 to provide for a water tight seal. In this embodiment, water is shown being used as ballast 34, but other methods of providing ballast 34 can also be used, such as previously described.

FIGS. 9–12 illustrates a typical bracing and stiffening of an internal-type bulkhead 24. The bulkhead 24 in FIG. 10 is shown in an elevated view above the U-shaped combination 26. Arrow symbols denote how the bulkhead 24 is mounted to the U-shaped combination 26. Depending upon the material used to make the bulkhead 24, the weight of the bulkhead 24 may be sufficient to prevent lifting of the bulkhead 24 when the module 10 is floated. For example, if concrete is used to make the bulkhead 24, no additional connection may be necessary. If wood is used, an internal-type bulkhead 24 can be secured to the base wall 16 through various mechanisms. In the embodiment illustrated in FIGS. 11 and 12, bulkhead lock down is accomplished through the use of cabling 60 running through U-shaped tubes 62 located under a hole 64 drilled in the lower bulkhead stiffener 42. Alternatively, since uplift forces are not nearly as forceful as the inward forces being resisted by the bulkhead braces 54, a pair of hydraulic cylinders 65 pushing a dowel (not shown) into a hole 67 in the side walls 22 may be sufficient to hold the bulkheads 24 down.

FIG. 11 illustrates how a bulkhead is sown to the module with a cable 60 running consecutively through each U-shaped tube 62 and hole 64 in the stiffener 42. The cable 60 has an eyelet 66 on one end that is larger than the hole 64. A retrieval chain 68 is attached to the cable 60. Multiple cables 60 may be necessary to avoid a cable of undue length during release of the bulkhead 24 from the base wall 16. Each cable 60 can have a retrieval chain 68 so that there is no confusion when pulling multiple cables 60 from a single bulkhead 24. A resilient, flexible L-shaped seal 70, such as a seal made from neoprene, is bolted along the bulkhead edges adjoining side walls 22 and the base wall 10. If the edges of the side walls 22 and the base wall 16 are sufficiently straight and true, water pressure alone may reduce leakage so that an external wrap of plastic 44 is not necessary.

Figure 14:
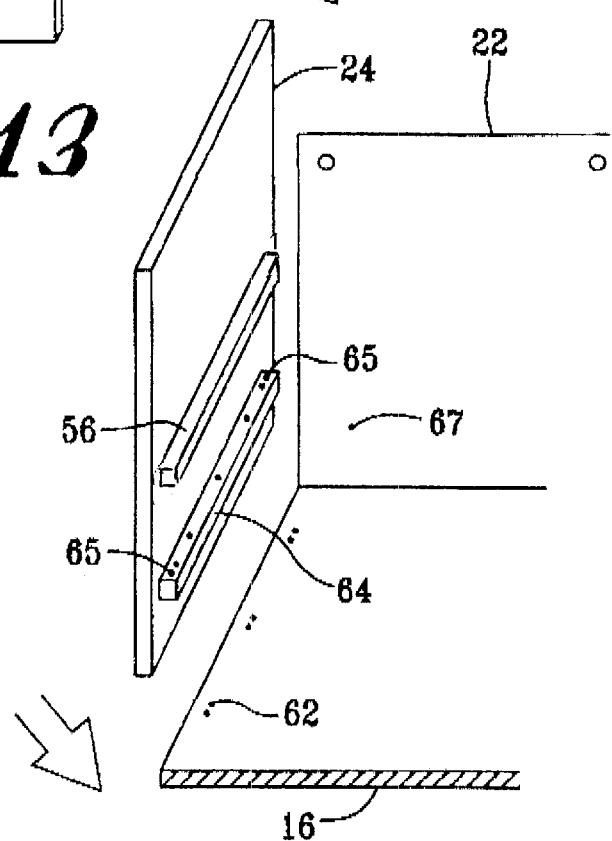
FIG. 14 is a second exploded detail view of the end wall portion of a floatable module having features of the invention.

FIGS. 13–16 illustrate the bracing and stiffening of a typical external-type bulkhead 24. The bulkhead 24 in FIG. 14 is shown in an elevated view above the U-shaped combination 26. Arrow symbols denote how the bulkhead 24 is mounted to the U-shaped combination 26. Again, depending upon the material used to make the bulkhead 24, the weight of the bulkhead 24 may be sufficient to prevent lifting of the bulkhead 24 when the module 10 is floated. A concrete bulkhead 24 would obviate the need for additional tie down connections. In the case of wooden bulkheads 24, external-type bulkheads 24 can be secured to the base wall 16 using cabling 60 running through U-shaped tubes 62 located closer to the front edge of the base wall 16. The U-shaped tubes 62 meet holes drilled in the lower bulkhead stiffener 42. As is the case of an internal-type bulkhead 24, uplift forces may be resisted by a hydraulic cylinder pushing a dowel (not shown) into a hole disposed in the side walls 22. Alternative methods of lock down, such as bolting or the inserting of the bulkhead 24 into a vertical slot with a transverse dowel at the top, can also be used.

Figure 15:
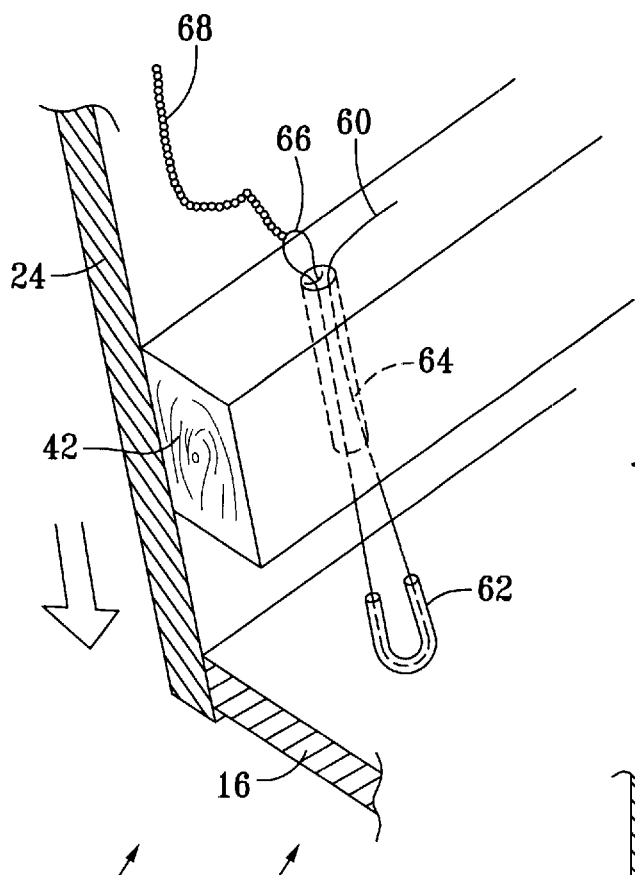
FIG. 15 is a second diagrammatic perspective detail view of the attachment of side walls in floatable modules having features of the invention.
Figure 16:
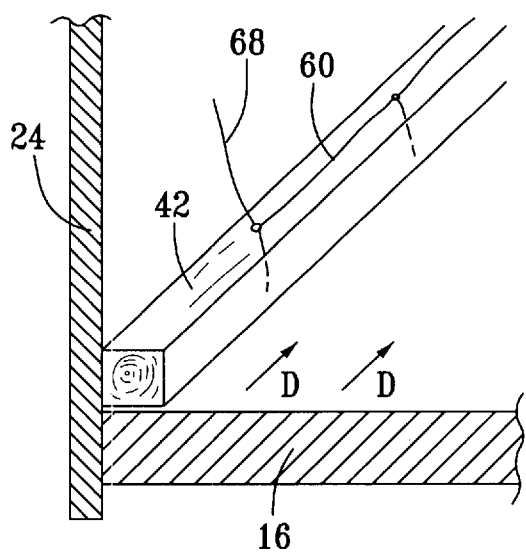
FIG. 16 is a third diagrammatic perspective view of the attachment of side walls in a floatable module having features of the invention.
Figure 17:
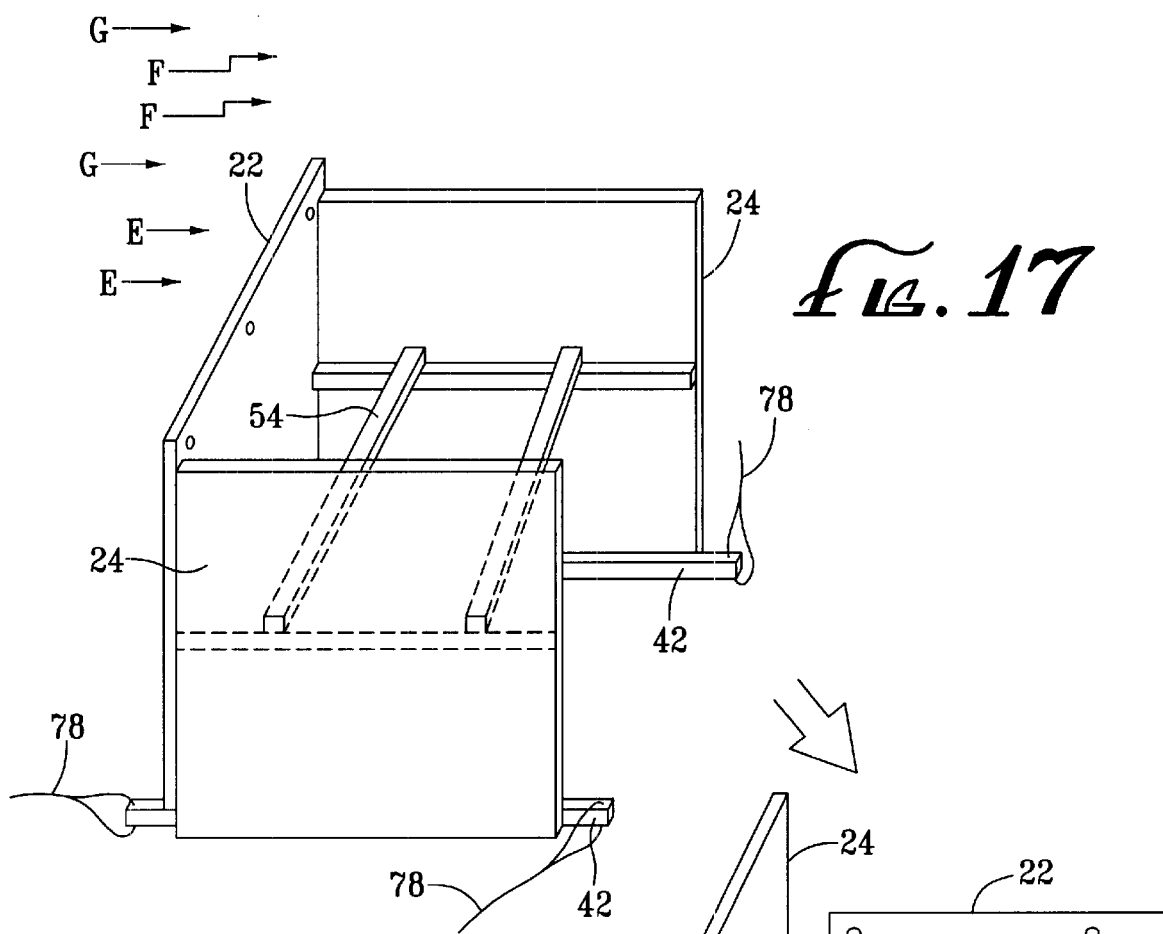
FIG. 17 is a third perspective diagrammatic detail of end walls and end wall supports useable in floatable modules having features of the invention.
Figure 18:
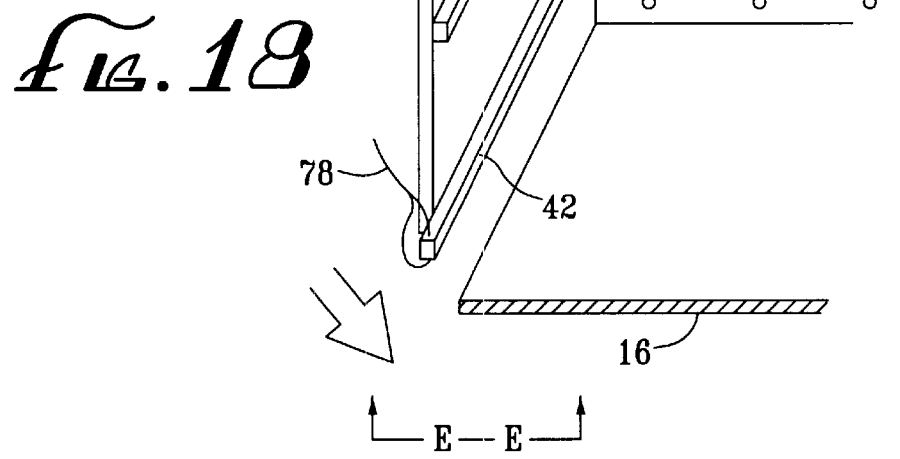
FIG. 18 is a third exploded detail view of the end wall portion of a floatable module having features of the invention.

FIGS. 15 and 16 illustrate how a bulkhead 24 can be sown with a cable 60 running consecutively through each U-shaped tube 62 and hole 64 in the stiffener 42. A physical seal is made when the bulkhead 24 overlaps the base wall 16. FIGS. 15 and 16 illustrate how the bulkhead 24 slides downward along the face of the front edge of the side walls 22 until the lower bulkhead stiffener 42 comes in contact with the base wall 16. The lower bulkhead stiffener 42 may require a shorter length if the base wall 16 is U-shaped as shown in FIG. 18. The connection is made water tight through use of a first plastic sheet 44. Again, water pressure and pump capacity may manage leakage so that an external wrap of plastic 44 is not necessary.

FIGS. 17–20 illustrate another embodiment, the bulkhead 24 in FIG. 18 is shown in an elevated view above the module 10. Likewise arrow symbols denote mounting. Because the bulkhead 24 supports the weight of the side walls 22, there is no need for additional tie downs. The preferred material is wood, however, other materials having sufficient mass and strength, such as steel, unreinforced concrete, or reinforced concrete can be used. The base wall 16 has a width slightly smaller than the bulkhead 24 (e.g., typically 38 feet, for a 42 foot wide bulkhead), the difference owing to the additional width introduced by short vertical flanges 72 on the base wall 16. The vertical flanges 72 have holes for flexible loose connectors to tie each side wall 22 to the base wall 16. The short vertical flanges 72 also provide additional rigidity, both to minimize bending loads seen by the side walls 22 from inward water pressure, as well to resist vertical loads introduced by soil ballast 34. This embodiment has only upper, not lower, external bulkhead braces 54 connected to a lower bulkhead stiffener 42. The lower bulkhead stiffener 42 does double duty, stiffening the bulkhead 24 and providing lateral support for the side walls 22.

Figure 19:
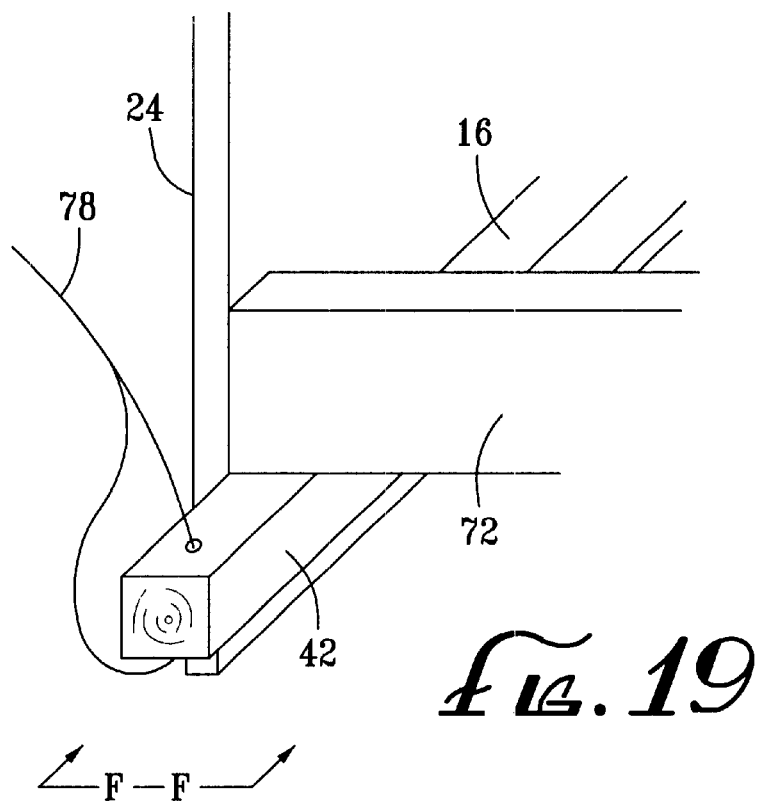
FIG. 19 is a third diagrammatic perspective detail view of the attachment of side walls in floatable modules having features of the invention.
Figure 20:
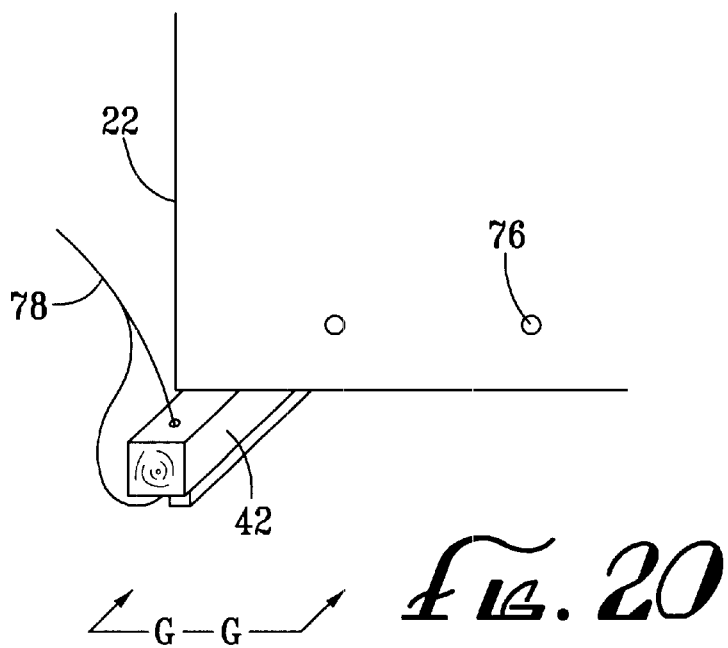
FIG. 20 is a third diagrammatic perspective view of the attachment of side walls in a floatable module having features of the invention.

FIGS. 19 and 20 illustrate placement of a forward bulkhead 24, with a lower bulkhead stiffener 42 just under the base wall 16. FIG. 20 illustrates a view after placement of a side wall 22 on the bulkhead stiffener 42. Like stiffeners 42 described above, the stiffener 42 illustrated in FIGS. 19 and 20 does double duty, both stiffening the bulkhead 24 and providing vertical support for the side walls 22. A hole 76 is placed in each side wall 22 to provide access for flexible connectors to the U-shaped base wall 16. A tow cable 78 penetrates the stiffener 42 and is tied to the top of the bulkhead 24. Another cable (not shown) can be used to remove the bulkhead 24 after the module is sunk.

Figure 21:
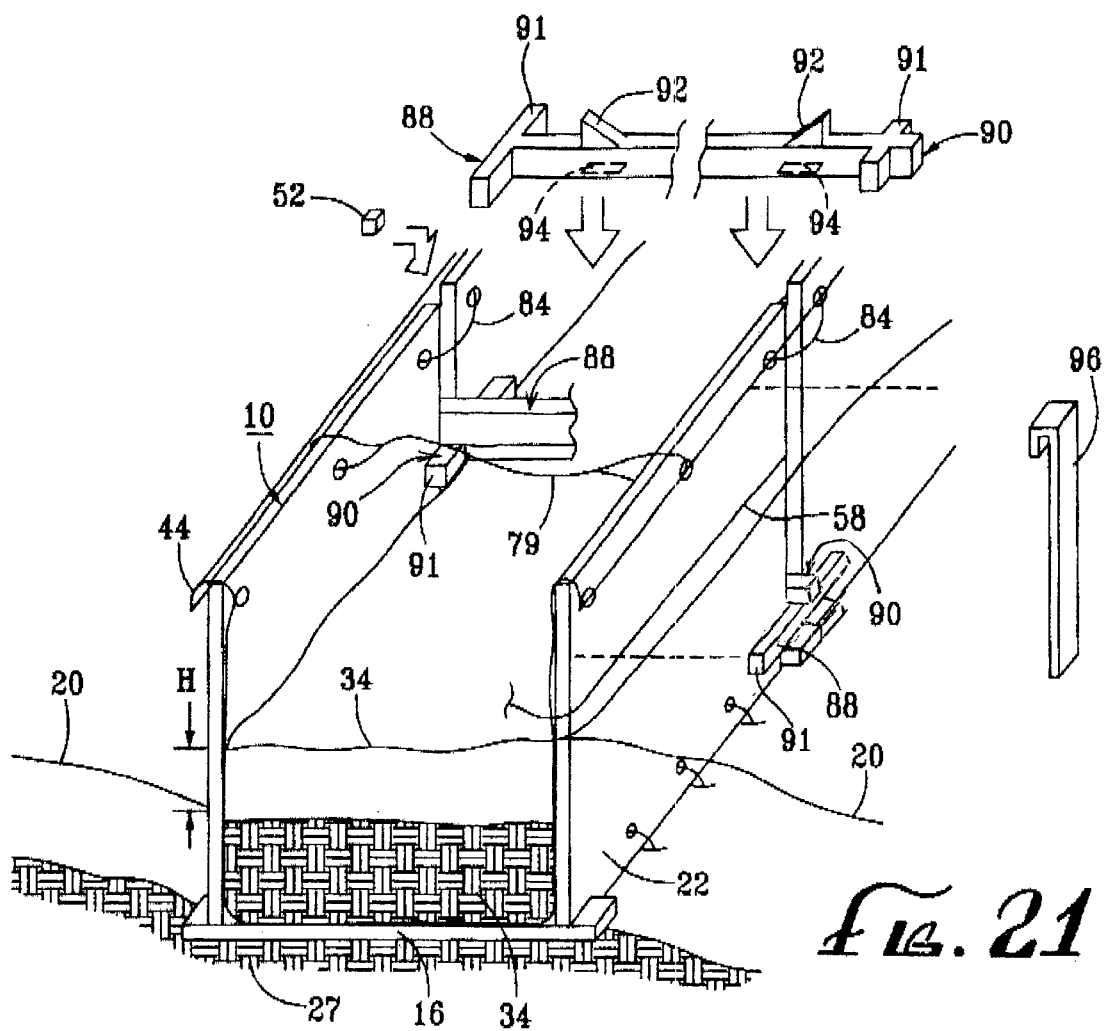
FIG. 21 is a perspective diagrammatic view of a floatable module having features of the invention shown disposed at the bottom of a body of water.

FIG. 21 illustrates a typical submergence operation. Prior to submergence, the module 10 has a number of cables attached for safety and convenience. A safety cable 79 is attached at a middle access hole. A hoop cable 58 is attached around the mid to upper third of the side walls 22 and is used as a connection to a tow line (not shown). A tie cable 84 is attached between an adjoining module 10 and the current module 10. Spacer blocks 52 are fixed near the top of the side walls 22 during submergence and positioning of the current module 10 in order to maintain a correct distance needed for tee bars 88 and plus bars 90 (described below).

Figure 22:
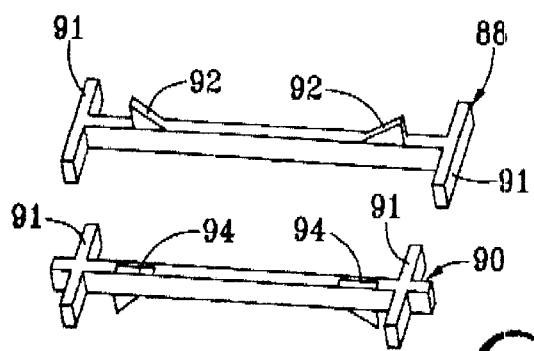
FIG. 22 is a perspective diagrammatic view detailing tee bars useable in a floatable module of the invention.

Tee bars 88 and plus bars 90 are used to brace and seal adjoining modules 10 to one another. Typical tee bars 88 and plus bars 90 are illustrated in FIG. 22. Tee bars 88 and plus bars 90 are horizontal beams stacked atop one another to fill in the gap between adjoining A modules 10. Tee bars 88 and plus bars 90 both have transverse members 91 disposed proximate to both of their two opposed ends. Tee bars 88 are sized and dimensioned so that the transverse members 91 are spaced apart by the external width of the side walls 22. Thus, the transverse member 91 are disposed externally of the side walls 22 when used in operation. Conversely, the transverse members 91 on the plus bars 90 are spaced apart by the internal width of the side walls 22. Thus, the transverse members 91 are disposed on the interior sides of the side walls 22 when the plus bars 90 are used in operation.

Tee bars 88 and plus bars 90 can both have a tab 92 on the top and a receiving recess 94 on the bottom. The plus bar 90 illustrated in FIG. 22 is shown in an inverted disposition. Adjoining submerged modules 10 typically have four or five tee bars 88 and plus bars 90 stacked up in the space between them. Typically, tee bars 88 and plus bars 90 alternate during stacking. The remaining open interval between concrete modules 10 can be covered with a hanging cover plate 96.

If an elevation difference is to be maintained in the body of water 8, additional tee bars 88 and plus bars 90, and greater amounts of soil ballast 34 may be required.

The tee bars 88 and plus bars 90 can be formed in several possible embodiments. In one embodiment, the tee bars 88 and plus bars 90 contain steel reinforcing bars (not shown) along the centerline of the longest dimension and along the centerline of each transverse member. The concrete used can contain admixtures of calcium nitrate to reduce corrosion and pozzolans, such as Pozzolith 322N by Master Builders Technologies, to reduce concrete permeability to hypersaline water. Other embodiments include stainless steel and prestressed cable for reinforcing. Over time, as corrosion-induced failure occurs in old tee bars 88 and plus bars 90, new tee bars 88 and plus bars 90 are added on top of the old tee bars 88 and plus bars 90.

In embodiments where bulkheads 24 are made of concrete, tee bars 88 and plus bars 90 are typically not used because the bulkheads 24 tend to remain in place.

Figure 23:
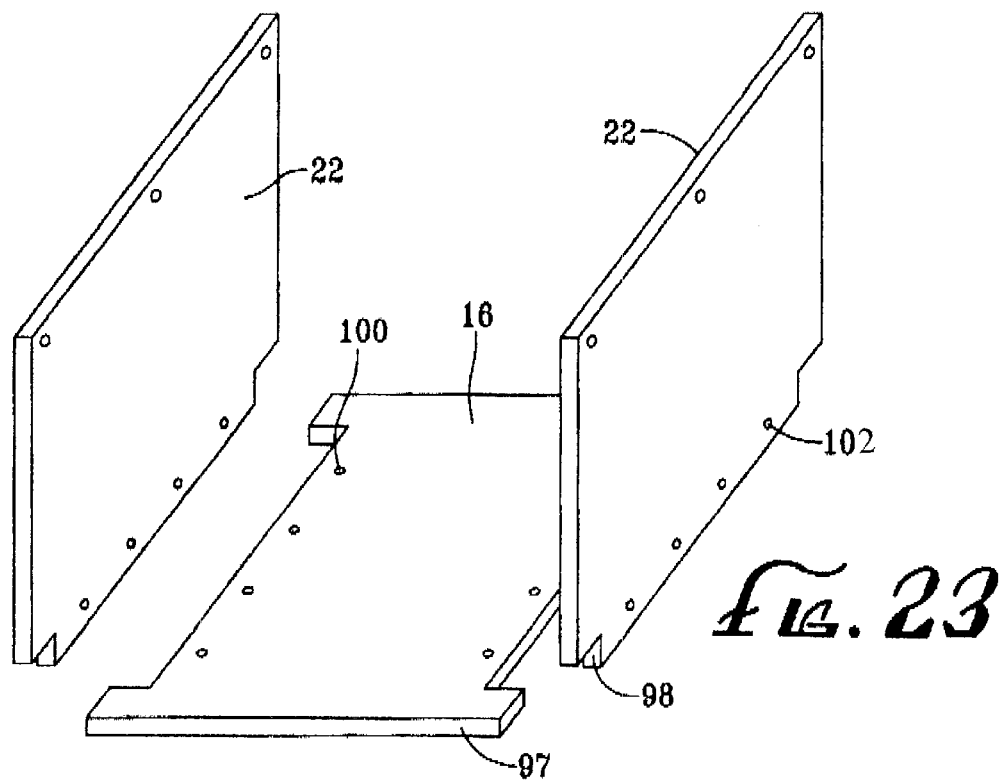
FIG. 23 is an exploded view of a floatable module having features of the invention.

FIG. 23 shows an exploded view of a notch-shaped embodiment of a U-shaped combination 26. The shape of the base wall 16 allows the notched side walls 22 to directly rest on an extended portion 97 of the base wall 16. Typically, a 40 foot side wall 22 has notches 98 of about 5 feet in length. The extended portion of the base wall 16 provides auxiliary support when disposed within a wall notch 98, so that the side walls 22 do not need to be supported by loose flexible connections or by the bulkhead 24 during transport. Access holes 100 in the base wall 16 and access holes 102 in the side walls 22 are provided to secure the walls 16 and 22 with loose flexible connectors.

Figure 24:
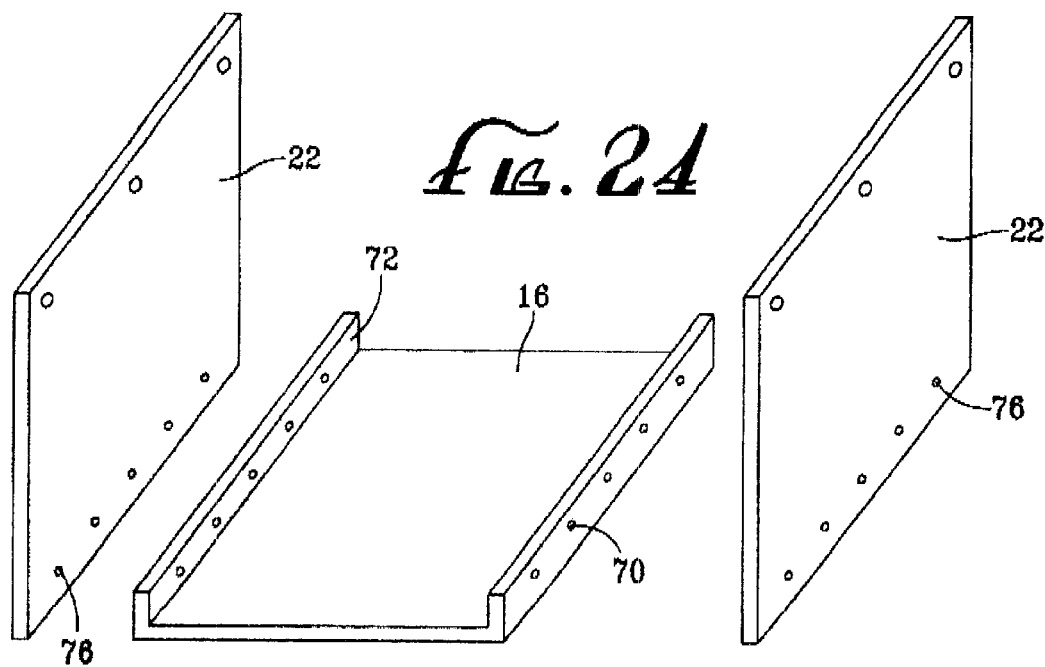
FIG. 24 is a second exploded view of a floatable module having features of the invention.

FIG. 24 shows an exploded view of a preferred embodiment of a submersible module 10. The shape of the base wall 16 is U-shaped. Typically a 40 foot tall side wall 22 is connected to a base wall 16 which has vertical side flanges 72 of about 4 feet in height. Each vertical flange 72 allows the side walls 22 to transfer more of the hydrostatic load to the base wall 16. Access holes 70 in the short vertical flanges 72 and access holes 76 of the side walls 22 are provided to secure the walls 16 and 22 with loose flexible connectors.

Figure 25:
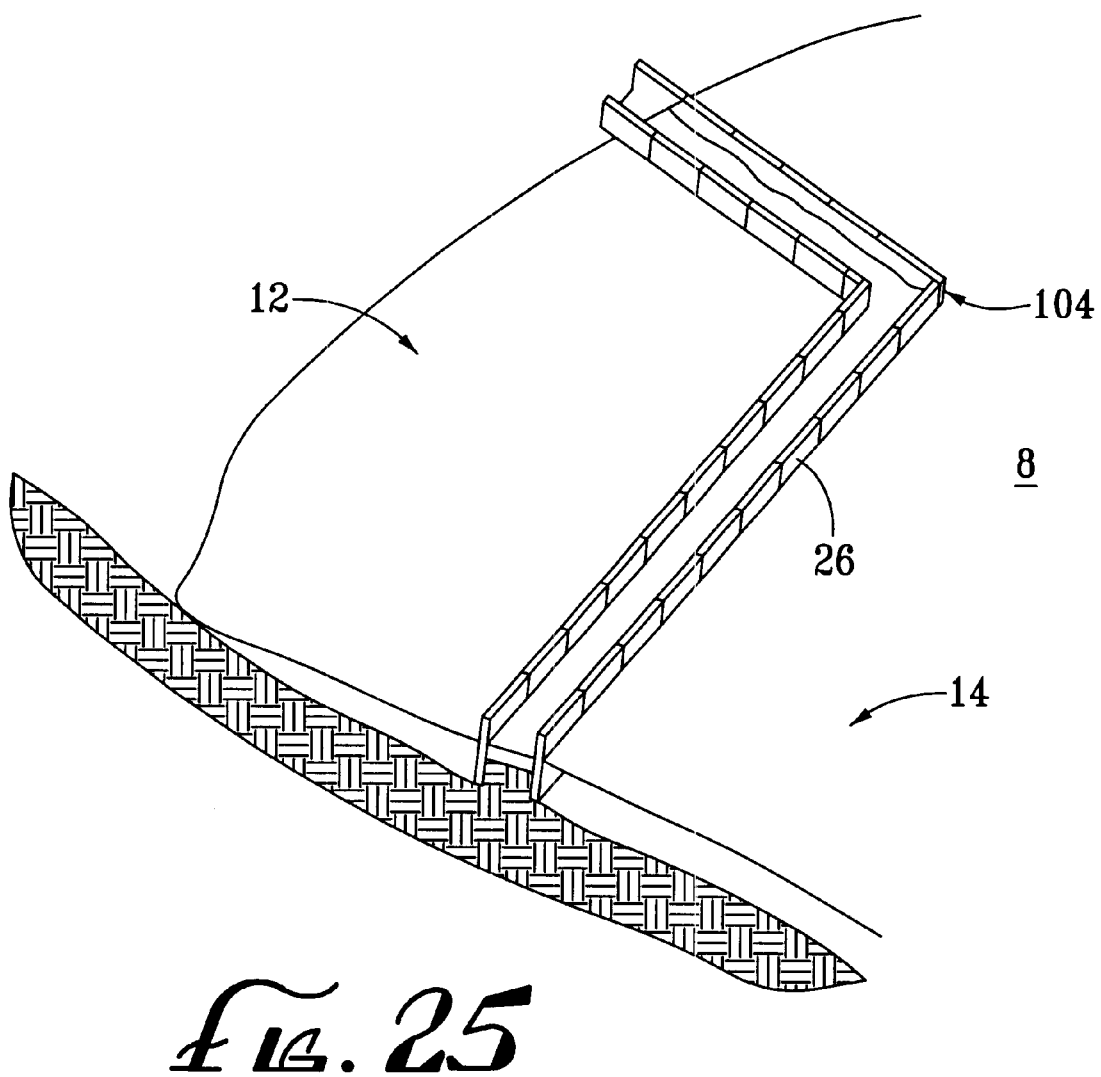
FIG. 25 is a perspective diagrammatic view showing the end-to-end disposition of a plurality of floatable modules pursuant to the method of the invention.

FIG. 25 illustrates a plurality of modules 10 aligned end to end to form a dike 104 in an open body of water 8. The modules 10 are aligned in a row to effectively segregate a first portion 12 of the body of water 8 from a second portion 14. In the embodiment illustrated in FIG. 25, no inlet devices or gates are installed. Slow leakage through the modules 10 occurs. In the case of a desert climate, where rainfall is limited and the first portion 12 of the dike 104 has no other water source, evaporation will cause water levels to drop within the first portion 12.

Construction of a typical modular dike 104 can be broken down into several distinct activities: construction and assembly, partial flotation, full flotation and transport, and finally water body regulation. The following discussion describes the sequence of activities for constructing a typical module dike 104 from concrete.

Each module 10 in the dike 104 can be constructed by several methods. A monolithic concrete submersible module 10 can be constructed using standard wooden forms for constructing cast-in-place rectangular chutes and spillways. All snap-ties holding opposite sides of the form together can be non-metallic to limit corrosion. Typically, vibration and concrete pumps are used to move wet concrete from the bottom of the side walls 22 to the center of the base wall 16.

Construction of a concrete module 10 by built up members significantly reduces the complexity and form of materials needed for module construction. The concrete side walls 22 and base walls 16 are poured as slabs and then raised using known concrete tilt-up methods. Plastic sheeting is placed on the ground surface forming one side of each wall 16 or 22 and the opposite side of the wall 16 or 22 is finished as a typical concrete slab by workman using standard concrete finishing tools. The plastic sheeting which is placed on the ground can be permanently attached to the walls 16 or 22 through the use of known embedments, such as small clips, before the concrete is poured. The use of embedments allows the plastic sheeting to function as an external water barrier.

A third method of forming a module 10 uses a combination of vertical wooden forms. The vertical forms have an open bottom which allows a portion of each side wall 22 to become the horizontal base wall 16 without effecting a break in the structure. This allows the base wall 16 to provide additional support to the base wall 22 during an earthquake and during transport.

A fourth method of forming a module 10 is similar to the third method, except that bottomless vertical forms are used which extend up the entire height of the side walls 22. This method requires careful attention to the timing of the introduction of concrete into the forms to avoid creation of a cold joint and to avoid pushing fresh concrete out the bottom of the side walls 22 to thereby thicken the base wall 16.

After forming and pouring, the concrete is allowed to cure sufficiently to allow the removal of the wooden forms. After removal of the wooden forms, a close inspection of the base wall 16 and the connection between the side wall 22 and base wall 16 is conducted to detect and repair any rock pockets which may have occurred. Thereafter, assembly of the built-up sections can be accomplished using cranes or known concrete wall tilt-up methods.

A typical method of the assembly of the embodiment illustrated in FIG. 24, is to pour the side walls 22 immediately adjacent to the base wall 16 with access holes in alignment. After the forms are removed, the side walls 22 are jacked up and loose flexible connections are inserted through side wall access holes and base wall access holes in the short vertical flanges 72 of the base wall 16. Loose flexible connections are installed through the access hole in both the side walls 22 and the base wall 16 for safety purposes and to later stabilize the structure during an earthquake.

Wooden bulkheads 24 are then lifted by crane and installed. Preferably, the bulkheads 24 are lifted and installed in various dug trenches. Each bulkhead 24 is weighted so that the buoyancy metacenter 32 is above the center of gravity 30 of the bulkhead 10 and the bulkhead 24 floats vertically. Alternative bulkheads 24 are sown into position using cable. Both wire and pull chain ends of each cable are draped over the center of each bulkhead 24.

When raised, the plastic sheeting previously affixed to the bottom of each side wall 22 now becomes the outside plastic sheeting of the side wall 22. Typically the plastic sheeting extends a minimum of three feet in all directions beyond each edge so that it can be folded over and tacked to the edge of the bulkhead 24. For monolithic embodiments, a sheet of plastic is tacked into place over all junctures in the base wall 16, side walls 22 and bulkheads 24 to prevent nuisance leaks.

In the case of built up embodiments, a hoop cable 58 is disposed around the entire structure at the mid to lower third of the side walls 22 to prevent the side walls 22 from falling outward. The hoop cable 58 later serves as a connection to a tow rope. For safety, a safety cable 79 is run from side wall 22 to side wall 22 and secured to access holes at the top of the side walls 22.

The last assembly action is to hang plastic sheeting on embedments disposed on the inside of each side wall 22.

After construction and assembly of the module 10, partial flotation is used to verify the tightness of the water seal around the bulkheads 24 and to offset outward loading from the introduction of soil ballast 34. In partial floatation, water is allowed to flow around the module 10 (typically to a depth of 5 feet on a 40 foot module) so that the module 10 has most of its weight supported by hydraulic forces, but not enough to lift it off the bottom to become independently buoyant. The inward hydrostatic force introduced by the water during partial floatation is primarily resisted by the base wall 16 on all sides. The upper bulkhead stiffeners 56 serve to provide sufficient force to prevent lateral rotation of the side walls 22. The hydrostatic force of water pushing inward during partial flotation is used to provide a resisting force for the outward pressure when soil ballast 34 is introduced. If partial flotation is not possible, then additional cables around the entire module 10 will generally be required prior to the introduction of soil ballast 34. If alternative methods of ballasting are used, such as use of cylindrical water tanks 36, partial flotation serves as a leak check. A monolithic module 10 does not need partial floatation for support prior to the introduction of soil ballast 34 because the side walls 22 are able to effectively transmit outward force to the base wall 16. However, partial flotation can be used to serve as a bulkhead leak check.

In all embodiments, the length of the bulkhead stiffeners 42 and 56 must be the proper length to extend from side wall 22 to side wall 22 prior to partial flotation in order to balance the opposite but equal inward hydrostatic forces exerting on both side walls 22. During partial flotation, the hydrostatic forces provide a mechanical seal on an external-type bulkhead 24 by pushing the bulkhead 24 against the side walls 22 and the base wall 16. An internal-type bulkhead 24 uses a flexible seal. The hydrostatic forces push the flexible seal against the bulkhead 24 and base wall 16 to form a tight mechanical seal.

After each module 10 is assembled, a bilge pump, typically an electric submersible bilge pump, is installed at approximately the lower third point of the side walls 22 (typically supported by a rope or cable) with piping (not shown) over the side walls 22.

After installing sufficient soil ballast 34 to move the buoyancy metacenter 32 above the center of gravity 30, the module 10 can be carefully floated out of the assembly area into deeper water where additional soil ballast 34 and/or water ballast 34 can be added for final tow to the designated location for placement. Additional ballast 34 can be added through three alternative methods: soil ballast added by truck, ship, crane, conveyor belt or by hydraulic dredge, water ballast introduced by pump as free water, or water introduced into parallel cylinders 36 or separate tanks.

Use of ballast water as free ballast 34 offers the advantage of greater ease of construction. Use of water containment structures, such as parallel tanks 36 or other tanks 41 affords greater stability and safety during towing operations.

Transport to the designated location can be carried out by attaching tow ropes (not shown) to the hoop cable 58 running around the module. Near the designated location, additional water is introduced so that the bottom of the module 10 is near the bottom of body of water 8. Spacers 52 are then attached to the top between an adjoining, previously submerged module 10 and the floating module 10 to ensure an adequate gap for removal of the bulkheads 24. After the floating module 10 is moved into position, the module 10 is sunk into the body of water 8.

After the module 10 is sunk into the body of water 8, the bulkheads 24 can be removed for reuse in another module 10. The first bulkhead 24 removed is the one proximate to the previously submerged in another module 10. In the case of an external-type bulkhead 24, pull chains attached to cables fixing the bulkhead 24 to the base wall 16 are pulled. A safety cable 79 on the top of the side walls 22 is tightened and the hoop cable 58 is removed.

In some case, one of the two removal cables attached to the lower bulkhead stiffener 42 is pulled out by a towing boat, effectively moving the stiffener 42 out from under the module 10. Spacers 52 at the top of the walls, in reaction to the force introduced by the towing action, rotate the side walls 22 upward slightly, allowing the lower stiffener 42 to slide out. The towing action takes place twice, once on each side. In other cases, the bulkheads 24 do not need towing for removal.

After each bulkhead 24 is removed, the spacers 86 between the previously submerged module 10 and the newly submerged module 10 are removed.

The bulkheads 24, if made of wood, float. Alternatively, bulkheads 24, if not made of wood, can be attached to floats. In either case, each bulkhead 24 can be floated vertically out of the gap between the submerged modules 10. In the case where the bulkhead 24 is made of concrete, however, the bulkhead is typically left in place.

Tee bars 88 and plus bars 90 are placed while the side walls 22 are continuing to be supported laterally by the remaining bulkhead 24. The tee bars 88 and plus bars 90 are installed using barge cranes or floats as necessary. After installation, the tee bars 88 and plus bars 90 prevent lateral movement of the side walls 22. Typically, only four or five tee bars 88 and plus bars 90 are necessary if the modular dike 104 is to be used for water quality control and the difference in water elevation is near zero. If the dike 104 is to serve as elevation control where the difference in elevation is greater than about 5% of total side wall height, then additional tee bars 88 and plus bars 90 (and soil ballast 34) will likely have to be added, or concrete bulkheads 24 used.

Next, cable is run through top access holes tying each new module 10 to the previously submerged module 10. Thereafter, a hanging cover plate 96 is installed.

Next the remaining bulkhead 24 is removed through a procedure similar to that which is described above. For some embodiments, the removal cables can be simply towed along the axis of the submerged module 10. Length of cable which tie the previous module 10 to the new module 10 are installed. These lengths of cable serve the same purpose as spacer blocks 86 in rotating the side walls 22 slightly during towing.

Tow boats return the bulkheads 24 to the assembly area for reuse in the next module 10.

Finally, in some embodiments, soil fillets 28 are placed by hydraulic dredge or by boat to ensure a good seal between each module 10 and the bottom of the body of water 8.

The modular dike 104 of the invention can be used to reduce salinity in a hypersaline lake, such as the Salton Sea. Typical hypersaline lakes exist in a closed basin with an annual evaporation rate exceeding annual precipitation. Water inflow is derived from the surrounding watershed and reflects the combined collection of rainfall from an area much larger than the water body. The depth of water in the water body is an artifact of the rate of water inflow from the watershed and the rate of evaporation. A higher rate of inflow, produces a greater depth. With increasing depth a typical hypersaline water body expands in surface area. The increase in surface area provides more water surface available for evaporation, yielding a higher rate of evaporation. If the flow remains relatively constant, the hypersaline lake reaches a dynamic balance between water inflow and evaporation.

The salinity of the hypersaline lake is dependent upon two components. The first component is the relative salinity of the water inflow from the surrounding watershed. The second component is the amount of salt already resident in the lake itself. Because salt is not carried away during the evaporation process, and because a typical hypersaline lake will have existed over decades if not centuries, the annual amount of salt carried by the water inflow from the surrounding watershed is typically small compared to the total resident salt in the lake. In the case of the Salton Sea, the salinity of influent to the Salton Sea is approximately 2,500 parts per million salt or 4 tons of salt per acre-foot of water. The Salton Sea holds 7 million acre-feet of water itself of which the salinity is approximately 44,000 parts per million salt or nearly 60 tons of salt per acre-foot of water. Salton Sea water is nearly fifteen times saltier than influent water. Every year approximately 1.3 million acre-feet flow into the Salton Sea and 1.3 million acre-feet are evaporated. Every year the influent adds another 4 million tons of salt to the 400 million tons already there. Because the salinity of the Salton Sea has reached the upper tolerance for the fishery which supports birds migrating on the Pacific Flyway, a need has arisen to reduce or at least stabilize the salinity of the Salton Sea.

The modular dike 104 of the invention can be used to divide the Salton Sea into two portions and thereby transporting salt from one section to the other. Salt transport is carried out by routing all relatively low salt influent water from the surrounding watershed into one portion and leaving the other portion to receive only hypersaline water after it has passed through the first portion. The salinity of the first portion then becomes a function of incoming salt minus outgoing salt. The rate of outgoing salt from the first portion depends upon the rate of evaporation in the second portion.

The main advantage present in this typical case is that there a great difference in salinity between influent and hypersaline lake water. This difference allows a second evaporative portion, much smaller in size than the original, to be constructed within the original water body in order to provide stability to the main water body. For example, the influent salinity into the Salton Sea is 4 tons per acre-foot, and the resident salinity of Salton Sea water is 60 tons per acre-foot. The relative size of the second evaporative portion need only be one fifteenth the size of the whole water body in order for the salt inflow in portion one to equal salt outflow to portion two.

From the description above, a number of advantages of the modular dike 104 of the invention become evident:

(1) The submersible modular dike 104 requires only a simple conveyance system. Typical earthen dikes use thousands of cubic yards of material which must be conveyed to the dike either by truck, train, or hydraulic dredge. Typically the rate of construction is limited to a single line of trucks traveling along a dike. The modular component 10 of the dike 104 can be constructed in multiple sites and floated into place greatly speeding construction without the large expense of building lengthy haul roads or the pumping of large amounts of silt laden water characteristic of dredges.

(2) The modular dike 104 uses substantially less material than earthen dikes resulting in lower overall cost.

(3) If made of concrete, the modular dike 104 is more resistant to erosion and if, completely inundated, requires far less repair than earthen dikes.

(4) Unlike driven in place sheet piling, each module 10 can be installed in greater water depths and is more easily relocated after installation.

(5) Each module 10, provides for repair by substitution of a new module 10 instead of having to re-work and recompact portions of an existing earthen dike (6) the modular dike 104 is more earthquake resistant than an earthen dike. Earthen dikes are subject to liquefaction and settlement.

Although the description above contains many specifications, these should not be construed as limiting the scope of the invention but as merely providing illustrations of some of the presently preferred embodiments of this invention. For example, the module can be of other shapes, such as circular, oval, trapezoidal, triangular, etc.; the bulkhead need not be entirely one piece but have an hinge in the center to fold up or unfold. The bulkhead could also operate in a manner similar to those found in canal locks and shipyards.

What is claimed is:

1. A method for segregating a body of water into two distinct parts comprising the steps of:
   (a) forming a plurality of floatable modules by a method comprising the following steps:
      (i) forming a U-shaped combination comprising a generally horizontal base wall and a pair of opposed generally vertical side walls; and
      (ii) assembling the generally vertical walls to the base wall in such a manner so as to form a floatable module;
   (b) floating each of the plurality of modules onto the body of water; and
   (c) sinking each of the plurality of modules at individual predetermined locations in the body of water, the generally vertical walls of each module having been chosen so as to have sufficient height to protrude above the water level of the body of water after the module is sunk at its predetermined location, each of the plurality of modules being sunk within the body of water such that each module is in close proximation to at least one adjoining module and such that the plurality of modules are aligned in a row which segregates the body of water into a first portion and a second portion.

2. The method of claim 1 wherein each module is made from concrete.

3. The method of claim 1 wherein each module is made from unreinforced concrete.

4. The method of claim 1 wherein each module is made from reinforced concrete.

5. The method of claim 1 wherein the base wall and the pair of opposed side walls comprise a single monolithic mass.

6. The method of claim 1 wherein the base wall and the pair of opposed side walls are each formed separately and then assembled together to form the U-shaped combination.

7. The method of claim 1 further comprising the step of sealing each module to each adjoining module.

8. The method of claim 7 wherein the step of sealing each module to each adjoining module comprises the step of attaching a cover plate between each pair of adjoining modules.

9. The method of claim 1 further comprising the step of bracing each module.

10. The method of claim 9 wherein the step of bracing each module comprises the step of disposing horizontal beams between each pair of adjoining modules.

11. The method of claim 10 wherein the horizontal beams comprise tee bars and plus bars.

12. The method of claim 11 wherein each tee bar is disposed in abutment with a plus bar.

13. The method of claim 1 further comprising the step of wrapping at least a portion of each module with a flexible wrap to enhance the floatability of the module before floating the module onto the body of water.

14. The method of claim 1 wherein the one or more general vertical walls comprises a pair of opposed removable bulkheads and wherein the method further comprises the step of removing the bulkheads from each module after the module has been sunk at its individual predetermined location in the body of water.

15. A method for segregating a body of water into two distinct parts comprising the steps of:
   (a) forming a plurality of floatable modules by a method comprising the following steps:
      (i) forming a U-shaped combination comprising a generally horizontal concrete base wall and a pair of opposed generally vertical concrete side walls; and
      (ii) enclosing the U-shaped combination with a pair of opposed bulkheads so as to form a floatable module,
   (b) floating each of the plurality of modules onto the body of water;
   (c) sinking each of the plurality of modules at individual predetermined locations in the body of water, the generally vertical walls of each module having been chosen so as to have sufficient height to protrude above the water level of the body of water after the module is sunk at its predetermined location, each of the plurality of modules being sunk within the body of water such that each module is in close proximation to at least one adjoining module and such that the plurality of modules are aligned in a row which segregates the body of water into a first portion and a second portion; and
   (d) bracing each module; and
   (e) sealing each module to each adjoining module such that the plurality of modules effectively segregates the first portion of the body of the water from the second portion.

16. The method of claim 15 wherein each U-shaped combination is made from unreinforced concrete.

17. The method of claim 15 wherein the base wall and the pair of opposed side walls comprise a single monolithic mass.

18. The method of claim 15 wherein the step of bracing each module comprises the step of disposing horizontal beams between each pair of adjoining modules.

19. The method of claim 15 wherein the step of sealing each module to each adjoining module comprises the step of attaching a cover plate between each pair of adjoining modules.

20. The method of claim 15 further comprising the step of wrapping at least a portion of each module with a flexible wrap to enhance the floatability of the module before floating the module onto the body of water.

21. The method of claim 15 comprising the additional step of removing the bulkheads from each module after the module has been sunk at its individual predetermine location in the body of water.

22. A method for regulating the water quality of a body of water comprising the steps of:
   (a) forming a plurality of floatable modules by a method comprising the following steps:
      (i) forming a U-shaped combination comprising a generally horizontal concrete base wall and a pair of opposed generally vertical concrete side walls; and
      (ii) enclosing the U-shaped combination with a pair of opposed bulkheads so as to form a floatable module
   (b) floating each of the plurality of modules onto the body of water;
   (c) sinking each of the plurality of modules at individual predetermined locations in the body of water, the generally vertical walls of each module having been chosen so as to have sufficient height to protrude above the water level of the body of water after the module is sunk at its predetermined location, each of the plurality of modules being sunk within the body of water such that each module is in close proximation to at least one adjoining module and such that the plurality of modules are aligned in a row which segregates the body of water into a first portion and a second portion; and (d) bracing each module;
(e) sealing each module to each adjoining module such that the plurality of modules effectively segregates a portion of the body of the water from the remaining portion of the body of water; and
(f) varying water inflow to the first portion of the body of water such that the water quality in the second portion of the body of water is regulated.

* * * * *